(12) United States Patent
Wendt

(10) Patent No.: US 6,865,273 B2
(45) Date of Patent: Mar. 8, 2005

(54) METHOD AND APPARATUS TO DETECT WATERMARK THAT ARE RESISTANT TO RESIZING, ROTATION AND TRANSLATION

(75) Inventor: Peter D. Wendt, Shiibuya-ku (JP)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 169 days.

(21) Appl. No.: 10/162,838

(22) Filed: Jun. 5, 2002

(65) Prior Publication Data

US 2003/0228030 A1 Dec. 11, 2003

(51) Int. Cl.⁷ .................................................. G06K 9/00
(52) U.S. Cl. ....................................................... 380/100
(58) Field of Search ................................ 382/100, 232; 358/3.28; 380/210, 287, 54, 51

(56) References Cited

U.S. PATENT DOCUMENTS

| | | |
|---|---|---|
| 4,313,984 A | 2/1982 | Moraw et al. |
| 5,084,790 A | 1/1992 | Endoh |
| 5,144,658 A | 9/1992 | Takahashi |
| 5,809,139 A | 9/1998 | Girod et al. |
| 5,915,027 A | 6/1999 | Cox et al. |
| 6,047,374 A | 4/2000 | Barton |
| 6,108,434 A | 8/2000 | Cox et al. |
| 6,141,441 A | 10/2000 | Cass et al. |
| 6,282,299 B1 | 8/2001 | Tewfik et al. |
| 6,282,300 B1 | 8/2001 | Bloom et al. |
| 6,381,341 B1 * | 4/2002 | Rhoads .................... 382/100 |
| 6,404,926 B1 | 6/2002 | Miyahara et al. |
| 6,424,725 B1 | 7/2002 | Rhoads et al. |
| 6,442,283 B1 * | 8/2002 | Tewfik et al. ............ 382/100 |
| 6,463,162 B1 | 10/2002 | Vora |
| 6,556,689 B1 | 4/2003 | Xia et al. |
| 6,563,937 B1 | 5/2003 | Wendt |
| 6,567,533 B1 * | 5/2003 | Rhoads ..................... 382/100 |
| 6,680,972 B1 * | 1/2004 | Liljeryd et al. ............ 375/240 |
| 2001/0036292 A1 | 11/2001 | Levy et al. |
| 2002/0090107 A1 | 7/2002 | Acharya et al. |
| 2003/0012402 A1 | 1/2003 | Ono |
| 2003/0021439 A1 | 1/2003 | Lubin et al. |
| 2003/0215112 A1 | 11/2003 | Rhodes et al. |

FOREIGN PATENT DOCUMENTS

| | | |
|---|---|---|
| EP | 0778566 | 6/1997 |
| JP | 2001-078010 | 3/2001 |
| WO | WO 97/26733 | 7/1997 |

OTHER PUBLICATIONS

Alghoniemy et al., "Geometric Distortion Correction Through Image Normalization," Proc. IEEE Int. Conf. on Multimedia and Expo 2000, vol. 3. Jul./Aug. 2000, pp. 1291–1294.

(List continued on next page.)

*Primary Examiner*—Jingge Wu
(74) *Attorney, Agent, or Firm*—Lerner, David, Littenberg, Krumholz & Mentlik, LLP

(57) ABSTRACT

A method and/or apparatus for detecting a watermark in a two-dimensional frame of data, the frame of data including a plurality of data values representing the watermark embedded in a frame of content data, the method comprising: computing a filtered frame of data from the frame of data having at least some harmonic frequency components corresponding to the watermark that are emphasized as compared to at least some frequency components corresponding to the content data; computing a two-dimensional Fourier transform of the filtered frame of data to produce a two-dimensional frequency spectrum of the filtered frame of data; selecting a set of frequency components associated with the watermark from among the frequency components of the two-dimensional frequency spectrum; and computing at least one of a rotation value, a resizing value, and a translation value associated with the watermark as compared to a reference watermark using one or more of the frequency components of the selected set.

140 Claims, 15 Drawing Sheets

OTHER PUBLICATIONS

Kusanagi et al., "An Image Correction Scheme for Video Watermarking Extraction," IEICE Trans. Fundamentals, vol. E84–A, No. 1, Jan. 2001 pp. 273–280.

Delannay et al., "Compensation of Geometrical Deformations for Watermark Extraction in the Digital Cimema Application," Proc. SPIE vol. 4314: Security and Watermarking of Multimedia Contents III, Jan. 2001, pp. 149–157.

Su et al., "Synchronized Detection of the Block–based Watermark with Invisible Grid Embedding," Proc. SPIE vol. 4314: Security and Watermarking of Multimedia Contents III, Jan. 2001, pp. 406–417.

Loo et al., "Motion estimation based registration of geometrically distorted Images for watermark recovery," Proc. SPIE vol. 4314: Security and Watermarking of Multimedia Contents III, Jan. 2001, pp. 606–617.

Su et al., "A Content–Dependent Spatially Localized Video Watermark for Resistance to Collusion and Interpolation Attacks," IEEE Proc. Int. Conf. on Image Processing, vol. 1, Oct. 2001, pp. 818–821.

Berghel, et al., "Protecting Ownership Rights Through Digital Watermarking," Internet Kiosk, Jul. 1996, pp. 101–103.

Cox, et al., "Secure Spread Spectrum Watermarking for Multimedia," NEC Research Institute Technical Report, 1995, pp. 1–33.

Braudaway, et al., "Automatic Recovery of Invisible Image Watermarks from Geometrically Distorted Images," Proc. SPIE vol. 3971: Security and Watermarking of Multimedia Contents II, Jan. 2000, pp. 74–81.

Chun–Shien Lu and Hong–Yuan Mark Liao, "Video Object–Based Watermarking: A Rotation and Flipping Resilient Scheme," IEEE Article, pp. 483–486, 2001.

Shelby Pereira, Joseph J. K. O Ruanaidh, Frederic Deguillaume, Gabriela Csurka and Thierry Pun, "Template Based Recovery of Fourier–Based Watermarks Using Log–polar and Log–log Maps," IEEE Article, pp. 870–874, 1999.

Shelby Pereira and Thierry Pun, "Transform for Digital Image Watermarking."

S. Tsekeridou and I. Pitas, "Wavelet–Based Self–Similar Watermarking For Still Images," IEEE Article, pp. 1–220–1–223, 2000.

I. Mora–Jimenez and A. Navia–Vazquez, "A New Spread Spectrum Watermarking Method with Self–Synchronization Capabilities,"0 IEEE Article, pp. 415–418, 2000.

Shelby Pereira and Thierry Pun, "Robust Template Matching for Affine Resistant Image Watermarks," IEEE Article, pp. 1123–1129, 2000.

Martin Kutter, "Towards Affine Invariant Image Watermarking Schemes," Swiss Federal Institute of Technology, Lausanne, pp. 1–27.

R. Caldelli, M. Barni, F. Bartolini and A. Piva, "Geometric–Invariant Robust Watermarking Through Constellation Matching In The Frequency Doman," IEEE Article, pp. 65–68, 2000.

I. Burak Ozer, Mahalingam Ramkumar and Ali N. Akansu, "A New Method For Detection of Watermarks In Geometrically Distorted Images," IEEE Article, pp. 1963–1966, 2000.

D. Delannay and B. Macq. "Generalized 2–D Cyclic Patterns For Secret Watermark Generation," IEEE Article, pp. 77–79, 2000.

H. Z. Hel–Or, Y. Yitzhaki and Y. Hel–Or, "Geometric Hashing Techniques For Watermarking," IEEE Article, pp. 498–501, 2001.

Sviatoslav Voloshynovskiy, Frederic Deguillaume and Thierry Pun, "Multibit Digital Watermarking Robust Against Local Nonlinear Geometrical Distortions," IEEE Article, pp. 999–1002, 2001.

Ross J. Anderson and Fabien A.P. Petitcolas, "Information Hiding An Annotated Bibliography," Computer Laboratory, University of Cambridge, pp. 1–62.

M. Kutter, S.K. Bhattacharjee and T. Ebrahimi, "Towards Second Generation Watermarking Schemes," IEEE Article, pp. 320–323, 1999.

N. Kaewkamnerd and K.R. Rao, "Wavelet Based Watermarking Detection Using Multiresolution Image Registration," IEEE Article, pp. II–171–II–175, 2000.

P. Termont, L. DeStrycker, J. Vandewege, J. Haitsma, T. Kalker, M. Maes, G. Depovere, A. Langell, C. Alm, P. Norman, "Performance Measurements of a Real–time Digital Watermarking System for Broadcasting Monitoring," IEEE Article, pp. 220–224, 1999.

Maurice Maes, Ton Kalker, Jaap Haitsma and Geert Depovere, "Exploiting Shift Invariance to Obtain a High Payload in Digital Image Watermarking," IEEE Article, pp. 7–12, 1999.

Jean–Paul Linnartz, Ton Kalker and Jaap Haitsma, "Detecting Electronic Watermarks in Digital Video," Philips Researchpp. 1–4.

Fabien A.P. Petitcolas, Ross J. Anderson and Markus G. Kuhn, "Information Hiding—A Survey," IEEE Article, pp. 1062–1078, 1999.

M. Kutter, Watermarking Resisting to Translation, rotation, and scaling, Signal Processing Laboratory, Swiss Federal Institute of Technology.

V. Solachidis and I. Pitas, "Circularly Symmetric Watermark Embedding in 2–D DFT Domain," IEEE Article, pp. 3469–3472, 1999.

V. Licks, R. Jordan, "On Digital Image Watermarking Robust To Geometric Transformations," IEEE Article, pp. 690–693, 2000.

Zhicheng Ni, Eric Sung and Yun Q. Shi, "Enhancing Robustness of Digital Watermarking against Geometric Attack Based on Fractal Transform," IEEE Article, pp. 1033–1036, 2000.

Masoud Alghoniemy and Ahmed H. Tewfik, "Image Watermarking By Moment Invariants," IEEE Article, pp. 73–76, 2000.

Anatasios Tefas and Ioannis Pitas, "Multi–Bit Image Watermarking Robust To Geometric Distortions," IEEE Article, pp. 710–713, 2000.

P. Termont, L. DeStrycker, J. Vandewege, M. Op de Beeck, J. Haitsma, T. Kalker, M. Maes and G. Depovere, "How To Achieve Robustness Against Scaling In A Real–Time Digital Watermarking System For Broadcsat Monitoring," IEEE Article, pp. 407–410, 2000.

Min–Suk Hong, Tae–Yun Chung, Kang–Seo Park and Sang–Hui Park, "A Private/Public Key Watermarking Technique Robust To Spatial Scaling," IEEE Article, pp. 102–103, 1999.

Nopporn Chotikakamthorn and Siriporn Pholsomboon, "Ring–shaped Digital Watermark for Rotated and Scaled Images Using Random–Phase Sinusoidal Function," IEEE Article, pp. 321–325, 2001.

Joseph J.K. O Ruanaidh and Thierry Pun, "Rotation, Scale and Translation Invariant Digital Image Watermarking," IEEE Article, pp. 536–539, 1997.

Ching–Yung Lin, Min Wu, Jeffrey A. Bloom, Ingemar J. Cox, Matt L. Miller and Yui Man Lui, "Rotation, Scale, and Translation Resilient Watermarking for Images," IEEE Article, pp. 767–782, 2001.

Sofia Tsekeridou, Nikos Nikolaidis, Nikos Sidiropoulos and Ioannis Pitas, "Copyright Protection of Still Images Using Self–Similar Chaotic Watermarks," IEEE Article, pp. 411–414, 2000.

* cited by examiner

| | | | | | | | |
|---|---|---|---|---|---|---|---|
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |

| | | | | | | | |
|---|---|---|---|---|---|---|---|
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |

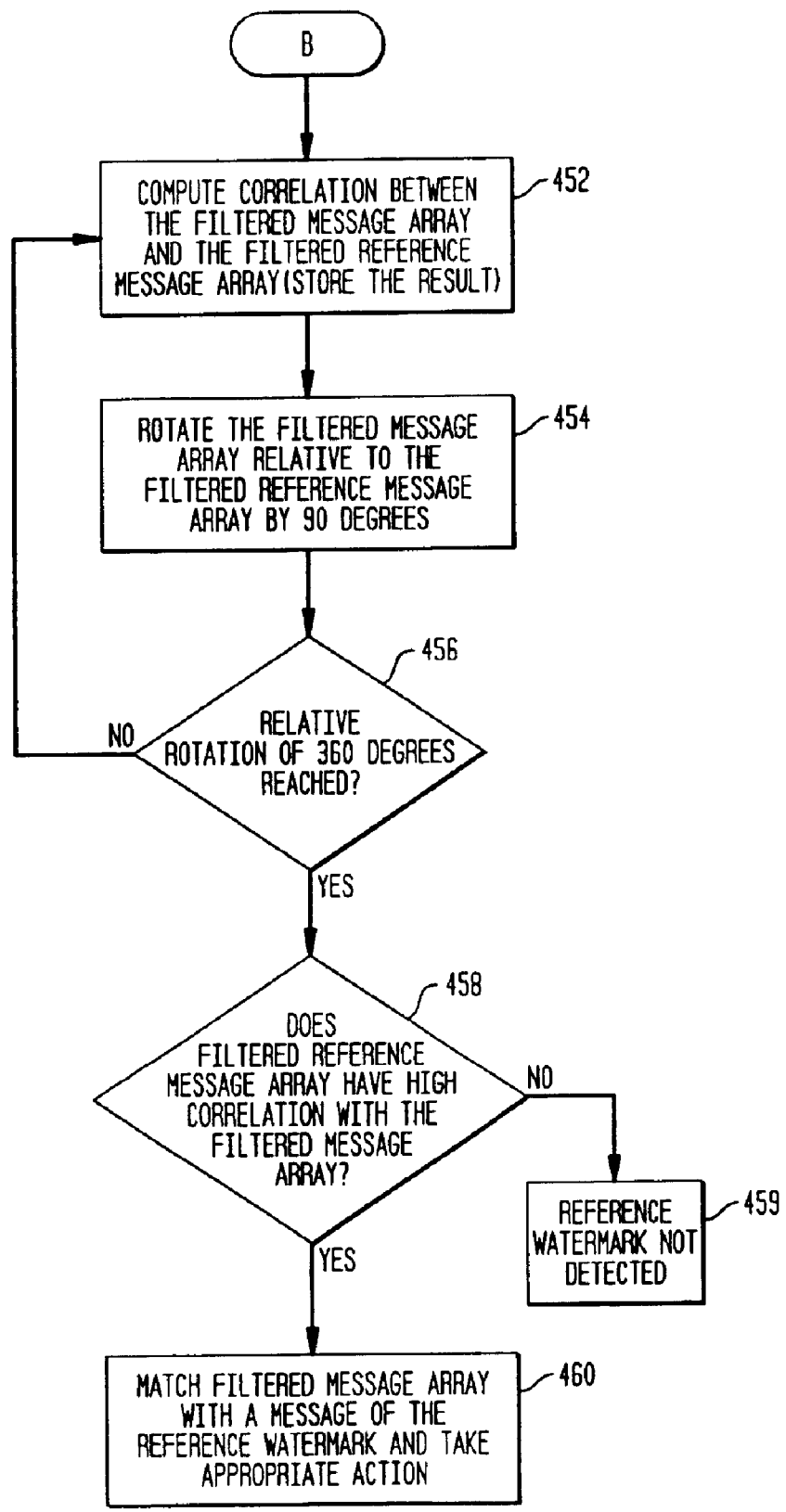

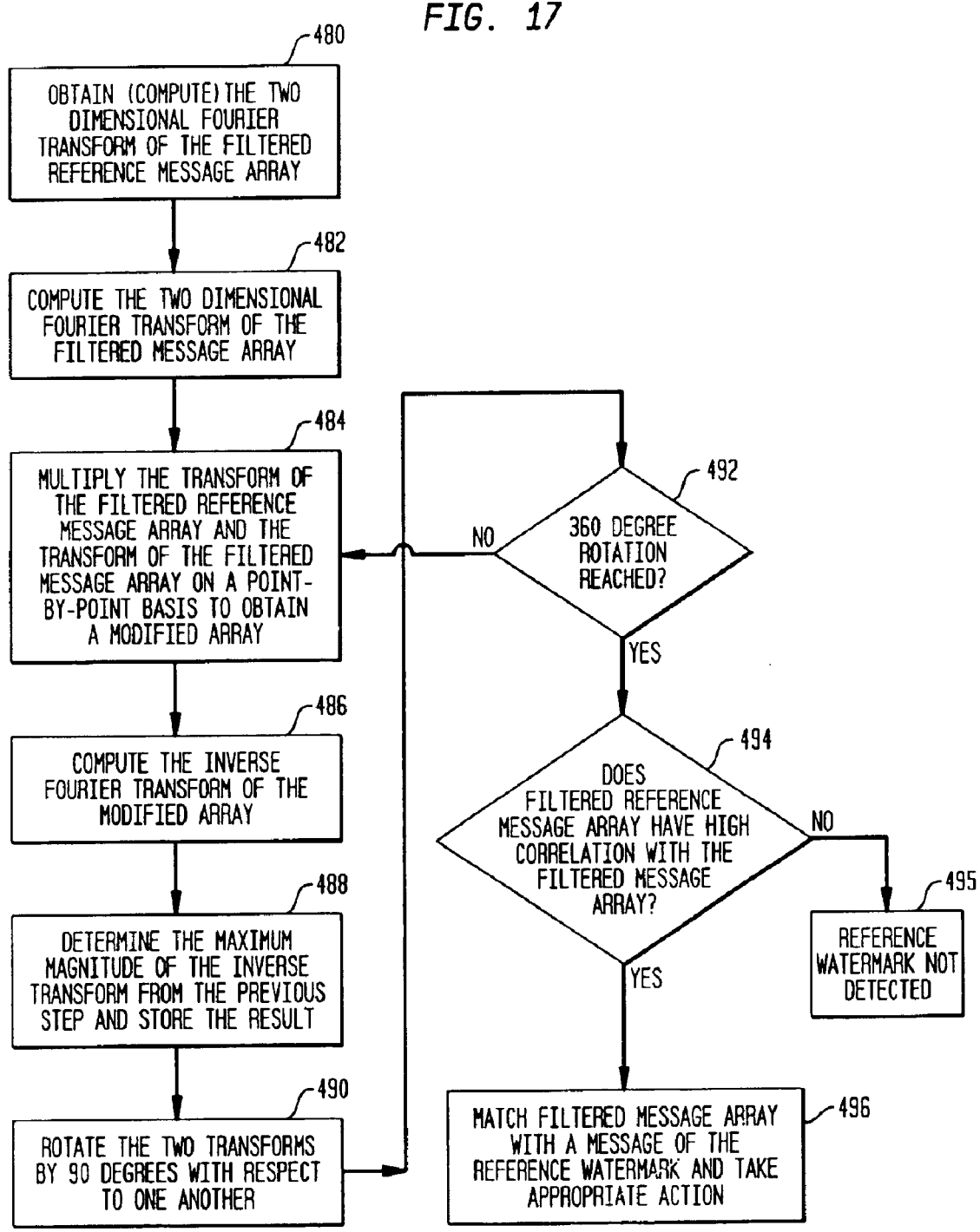

METHOD AND APPARATUS TO DETECT WATERMARK THAT ARE RESISTANT TO RESIZING, ROTATION AND TRANSLATION

BACKGROUND OF THE INVENTION

The present invention relates to the detection of watermarks embedded in a frame of content data and, more particularly, the present invention relates to methods and/or apparatuses for detecting a watermark that are resistant to resizing, rotation, and/or translation.

It is desirable to the publishers of content data, such as music, video, software, and combinations thereof to prevent or deter the pirating of the content data. The use of watermarks has become a popular way of thwarting pirates. A watermark is a set of data containing a hidden message that is embedded in the content data and stored with the content data on a storage medium, such as a digital video disc (DVD), compact disc (CD), read only memory (ROM), random access memory (RAM), magnetic media, etc. The hidden message of the "embedded watermark" is typically a copy control message, such as "do not copy" or "copy only once."

When a quantum of data comprising the content data and the embedded watermark is correlated with a reference watermark, a determination can be made as to whether the embedded watermark is substantially similar to, or the same as, the reference watermark. If a high correlation exists, then it may be assumed that the message of the embedded watermark corresponds to a message of the reference watermark. For example, the quantum of data may be a frame of data, such as video data, in which pixel data of the frame of video data has been embedded with a watermark ("the embedded watermark"). Assuming that the frame of data has not been distorted in some way, when a reference watermark that is substantially the same as the embedded watermark is correlated with the frame of video data, a relatively high output is obtained. This is so because a one-for-one correspondence (or registration) between the data of the embedded watermark and the data of the reference watermark will tend to increase a correlation computation. Conversely, if the embedded watermark contained in the frame of video data has been altered in a way that reduces the one-for-one correspondence between the embedded watermark and the reference watermark, the correlation will yield a relatively low result.

Often, the correlation computation involves performing a sum-of-products of the data contained in the frame of data and the data of the reference watermark. Assuming that the frame of data and the reference watermark include both positive magnitude values and negative magnitude values, the sum-of-products will be relatively high when the data of the embedded watermark aligns, one-for-one, with the data of the reference watermark. Conversely, the sum-of-products will be relatively low when the data of the embedded watermark does not align with the reference watermark.

A data detector, such as a standard correlation detector or matched filter, may be used to detect the presence of an embedded watermark in a frame of content data, such as video data, audio data, etc. The original or reference position of the embedded watermark is implicitly determined by the design of the hardware and/or software associated with the detector. These types of correlation detectors are dependent upon specific registration (i.e., alignment) of the embedded watermark and the reference watermark.

Pirates seeking to wrongfully copy content data containing an embedded watermark (e.g., one that proscribes copying via a hidden message: "do not copy") can bypass the embedded watermark by distorting the registration (or alignment) between the embedded watermark and the reference watermark. By way of example, a frame of content data containing an embedded watermark may be slightly rotated, resized, and/or translated from an expected position to a position that would prevent a one-for-one correspondence (perfect registration) between the embedded watermark and the reference watermark. Editing and copying equipment may be employed to achieve such distortion.

The malfeasance of pirates notwithstanding, inadvertent distortion of the embedded watermark may occur during the normal processing of the content data (containing an embedded watermark) in a computer system or consumer device. For example, the content data (and embedded watermark) of a DVD may be inadvertently distorted while undergoing a formatting process, e.g., that converts the content data from the European PAL TV system to the US NTSC TV system, or vice versa. Alternatively, the content data and embedded watermark may be distorted through other types of formatting processes, such as changing the format from a widescreen movie format to a television format. Indeed, such processing may inadvertently resize, rotate, and/or translate the content data and, by extension, the embedded watermark, rendering the embedded watermark difficult to detect.

Different types of watermark systems exist that purport to be robust to resizing and translation. One such watermark system typically embeds the watermark in a way that is mathematically invariant to resizing and translation, such as the system disclosed in U.S. Pat. No. 6,282,300, the entire disclosure of which is hereby incorporated by reference. The detector used in this type of system does not have to adjust to changes in the position and/or size of the embedded watermark. Such a system is typically based on Fourier-Mellin transforms and log-polar coordinates. One drawback of this system is that it requires complex mathematics and a particularly structured embedded watermark pattern and detector. This system cannot be used with pre-existing watermarking systems.

Another prior art watermark system uses repetitive watermark blocks, wherein all embedded watermark blocks are identical. The watermark block in this type of system is typically large and designed to carry the entire copy-control message. The repetition of the same block makes it possible to estimate any resizing of the embedded watermark by correlating different portions of the watermarked image and finding the spacing between certain positions. The resizing is then inverted and the reference block is correlated with the adjusted image to find the embedded watermark and its position simultaneously. An example of this system is the Philips VIVA/JAWS+ watermarking system. A disadvantage of this system is that the design of the embedded watermark must be spatially periodic, which does not always occur in an arbitrary watermarking system.

Yet another type of watermarking system includes an embedded template or helper pattern along with the embedded watermark in the content data. The detector is designed to recognize the reference location, size and shape of the template. The detector attempts to detect the template and then uses the detected position of the template to estimate the actual location and size of the embedded watermark. The system then reverses any geometric alterations so that the correlation detector can detect and interpret the embedded watermark. This system is disadvantageous, however, since the templates tend to be fragile and easily attacked.

Accordingly, there is a need in the art for a new method and/or system for detecting an embedded watermark in a frame of data that is robust despite rotation, resizing and/or translation of the embedded watermark as compared to a reference watermark.

SUMMARY OF THE INVENTION

In accordance with one or more aspects of the invention, a method of detecting a watermark in a two-dimensional frame of data is provided. The frame of data includes a plurality of data values representing the watermark embedded in a frame of content data. The method preferably includes: computing a filtered frame of data from the frame of data having at least some harmonic frequency components corresponding to the watermark that are emphasized as compared to at least some frequency components corresponding to the content data; computing a two-dimensional Fourier transform of the filtered frame of data to produce a two-dimensional frequency spectrum of the filtered frame of data; selecting a set of frequency components associated with the watermark from among the frequency components of the two-dimensional frequency spectrum; and computing at least one of a rotation value, a resizing value, and a translation value associated with the watermark as compared to a reference watermark using one or more of the frequency components of the selected set.

The frame of data may include any type of data, such as pixel data or audio data.

The step of selecting the set of frequency components associated with the watermark preferably includes selecting at least some of the harmonic frequency components corresponding to the watermark from among the frequency components of the two-dimensional frequency spectrum. Preferably, the harmonic frequency components include the second harmonic frequency components.

The step of computing the rotation value corresponding to the watermark may include determining an angle between a first axis and a reference axis, the first axis being defined by a reference point and at least one of the selected harmonic frequency components corresponding to the watermark and the reference axis being defined by the reference watermark. The reference axis preferably lies along at least one of the x-axis and the y-axis. The rotation value corresponding to the watermark is substantially proportional to: arctangent $((Fy1*W)/(Fx1*H))$, where Fy1 and Fx1 are the y-axis and x-axis coordinates, respectively, of one of the selected harmonic frequency components corresponding to the watermark.

The step of computing the resizing value corresponding to the watermark preferably includes computing an x-axis resizing value and a y-axis resizing value. The step of computing the x-axis resizing value may include: computing an x-axis period, Px, from the origin to one of the selected harmonic frequency components corresponding to the watermark; and computing a ratio of Px to an x-axis reference period, Prx, of the reference watermark to obtain the x-axis resizing value. The x-axis period, Px, is substantially equal to $(H*W)/\sqrt{((Fx1*H)^2+(Fy1*W)^2)}$, where Fx1 and Fy1 are the x-axis and y-axis coordinates, respectively, of the one of the selected harmonic frequency components corresponding to the watermark.

The step of computing the y-axis resizing value preferably includes: computing a y-axis period, Py, from the origin to one of the selected harmonic frequency components corresponding to the watermark; and computing a ratio of Py to a y-axis reference period, Pry, of the reference watermark to obtain the y-axis resizing value. The y-axis period, Py, is substantially equal to $(H*W)/\sqrt{((Fx2*H)^2+(Fy2*W)^2)}$, where Fx2 and Fy2 are the x-axis and y-axis coordinates, respectively, of the one of the selected harmonic frequency components corresponding to the watermark.

The translation value is based on a first distance in a first direction and a second distance in a second direction. The first distance is proportional to a phase, $\theta 1$, of one of the selected harmonic frequency components corresponding to the watermark. The second distance is proportional to a phase, $\theta 2$, of another of the selected harmonic frequency components corresponding to the watermark. The first distance is substantially equal to $(\theta 1*H*W)/2\pi*\sqrt{((Fx1*H)^2+(Fy1*W)^2)}$, where Fx1 and Fy1 are the x-axis and y-axis coordinates, respectively, of the one of the selected harmonic frequency components corresponding to the watermark. The second distance is substantially equal to $(\theta 2*H*W)/2\pi*\sqrt{((Fx2*H)^2+(Fy2*W)^2)}$, where Fx2 and Fy2 are the x-axis and y-axis coordinates, respectively, of the other of the selected harmonic frequency components corresponding to the watermark.

The first direction is substantially proportional to arctangent $((Fy1*W)/(Fx1*H))$; and the second direction is substantially proportional to arctangent $((Fy2*W)/(Fx2*H))$. Preferably, the first and second directions are substantially perpendicular to one another.

The method preferably further includes determining a plurality of locations within the frame of data corresponding to at least some of the data blocks of the watermark in accordance with at least one of the rotation value, the resizing value, and the translation value of the watermark. The method also may include determining a filtered array of message values, each filtered message value corresponding with one of the at least some of the data blocks of the watermark and being equal to a sum-of-products of data values of a reference data block and a respective set of data values of the one of the at least some of the data blocks of the watermark.

The method preferably further includes determining a filtered array of reference message values, each filtered reference message value corresponding with one of at least some of the data blocks of the reference watermark and being equal to a sum-of-products of data values of the reference data block and the data values of the one of the at least some of the data blocks of the reference watermark. A sum-of-products of the filtered array of message values and the filtered array of reference message values is obtained. A determination that the watermark contains a message that corresponds to a message of the reference watermark is made when the sum-of-products of the filtered array of message values and the filtered array of reference message values meets or exceeds a threshold.

The method may further include translating the filtered array of message values with respect to the filtered array of reference message values by at least one message value location in at least one of a horizontal direction and a vertical direction; computing a sum-of-products of the filtered array of message values and the filtered array of reference message values; repeating the translating and computing steps one or more times; and determining that the watermark contains a message that corresponds to a message of the reference watermark when one of the sum-of-products computations meets or exceeds a threshold.

Preferably, the method further includes: rotating the filtered array of message values with respect to the filtered array of reference message values in accordance with a multiple of 90°; computing a sum-of-products of the filtered array of message values and the filtered array of reference message values; repeating the rotating and computing steps one or more times; and determining that the watermark contains a message that corresponds to a message of the reference watermark when one of the sum-of-products computations meets or exceeds a threshold.

In accordance with a further aspect of the invention, the method further includes: obtaining a two-dimensional Fourier transform of the filtered array of reference message values; computing a two-dimensional Fourier transform of the filtered array of message values; computing a modified array by taking a product of the two-dimensional Fourier transform of the filtered array of reference message values and the two-dimensional Fourier transform of the filtered array of message values on a point-by-point basis; computing an inverse Fourier transform of the modified array; determining a maximum value from the inverse Fourier transform of the modified array; rotating the two-dimensional Fourier transform of the filtered array of reference message values relative to the two-dimensional Fourier transform of the filtered array of message values by a multiple of 90°; computing subsequent modified array by taking a product of the two-dimensional Fourier transform of the filtered array of reference message values and the two-dimensional Fourier transform of the filtered array of message values on a point-by-point basis; computing an inverse Fourier transform of the subsequent modified array; determining a subsequent maximum value from the inverse Fourier transform of the subsequent modified array; repeating the rotating, computing, and determining steps one or more times; and determining that the watermark contains a message that corresponds to a message of the reference watermark when one of the maximum values meets or exceeds a threshold.

In accordance with one or more further aspects of the invention, the methods above may be implemented in hardware, for example, using off-the-shelf digital and/or analog components, by utilizing one or more application specific integrated circuits (ASICs), and/or utilizing one or more processing devices, such as programmable digital signal processing devices, microprocessors, computers operating under the control of one or more software programs, etc. Alternatively, this functionality may be implemented as a software program that may be executed by an appropriate processing device, such as a computer, to achieve the one or more aspects of the invention. The software program may be stored on an appropriate storage medium, such as a floppy disc, a CD-ROM, a memory chip, etc.

Other advantages, features and aspects of the invention will be apparent to one skilled in the art in view of the discussion herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

FIGS. 2A and 2B illustrate further details concerning the structure of the watermark of FIG. 1;

FIG. 16 is a flow diagram showing still further additional actions and/or functions that may be carried out in addition to those shown in FIG. 14; and FIG. 17 is a flow diagram showing actions and/or functions that may be carried out in accordance with alternative aspects of the present invention in order to detect an embedded watermark in a frame of data that has been at least one of rotated, resized, and translated.

DETAILED DESCRIPTION

Figure 1:
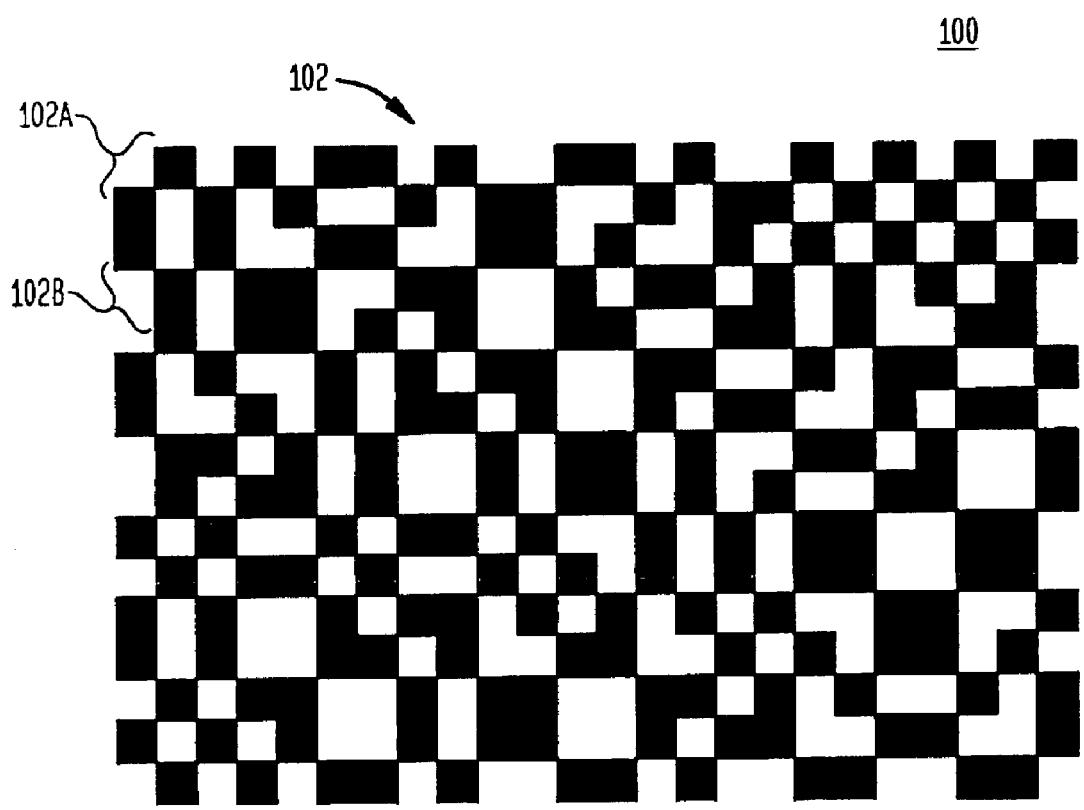
FIG. 1 is a conceptual graphical representation of a block based watermark suitable for use in the present invention.

Referring now to the drawings wherein like numerals indicate like elements, there is shown in FIG. 1 a general block-based structure of a preferred watermark 100 in accordance with at least one aspect of the present invention. The data of the watermark 100 may be embedded in content data, in which case the watermark 100 would be referred to herein as an "embedded watermark" 100. Alternatively, the watermark 100 may represent a desired configuration for a watermark embedded in a frame of data (e.g., having not been rotated, resized, translated, etc.), in which case the watermark 100 would be referred to herein as a "reference watermark" 100.

The watermark 100 is shown to have certain graphic properties (e.g., patterns) and, therefore, it may be inferred that the watermark 100 is to be used in a graphics context, such as by embedding it in one or more frames of video data (e.g., pixel data) and/or by using it as a reference watermark to detect an embedded watermark. It is understood, however, that the watermark 100 may also be utilized in any other suitable context, such as in an audio data context, etc.

Preferably, the watermark 100 includes a plurality of data blocks 102, each data block 102 having an array of data values (such as pixel values, audio values, etc.). The array of each data block 102 is preferably an N×N array, although a non-square array may also be employed without departing from the scope of the invention. The data values of each data block 102 are arranged in one of a plurality of patterns. As shown, the data blocks 102 of the watermark 100 preferably include data values arranged in either a first pattern or a second pattern. For example, data block 102A may be of the first pattern and data block 102B may be of the second pattern.

Reference is now made to FIG. 2A, which illustrates further details of a data block 102 of the first pattern, such as data block 102A. Assuming a Cartesian system of coordinates, the first pattern may be defined by four quadrants of data values, where the first and third quadrants have equal data values and the second and fourth quadrants have equal data values. By way of example, the data values of the first and third quadrants may represent negative magnitudes (e.g., −1) and are shown as black areas in FIG. 1, while the data values of the second and fourth quadrants may represent positive magnitudes (e.g., +1) and are shown as white areas in FIG. 1. With reference to FIG. 2B, the second pattern (e.g. data block 102B) may also be defined by four quadrants of data values, where the first and third quadrants have equal data values and the second and fourth quadrants have equal data values. In contrast to the first pattern, however, the data values of the first and third quadrants of the second pattern may represent positive magnitudes (white areas in FIG. 1), while the data values of the second and fourth quadrants may represent negative magnitudes (black areas in FIG. 1).

One of the first and second patterns of data values, for example the first pattern (e.g., data block 102A), preferably represents a logic state, such as one, while the other pattern, for example the second pattern (e.g., data block 102B), represents another logic state, such as zero. The array of data blocks 102 of the watermark 100 therefore may represent a pattern of logic states (e.g., ones and zeros) defining the hidden message in the frame of data.

Notably, the data values of the first pattern and the data values of the second pattern consist of two opposite polarity magnitudes (e.g., +1 and −1) such that a sum-of-products of the data values of a data block 102 having the first pattern (e.g., 102A) and a data block 102 having the second pattern (e.g., 102B) is a peak number, either positive or negative, although in the example herein, the sum of magnitudes is a peak negative number (because the products of the data values are all −1). In keeping with the example above, a sum-of-products of the data values of a data block 102 having the first pattern (102A) and a data block 102 having the second pattern (102B) is a peak positive number when one of the data blocks 102A, 102B is rotated by 90° with respect to the other data block. This is so because the products of the data values are all +1 when one of the data blocks 102A, 102B is rotated by 90°.

It is also noted that the data blocks 102A, 102B of the watermark 100 are robust to small rotations of one block relative to the other, particularly near 0°, 90°, 180°, etc. As will be apparent to one skilled in the art from the discussion below, these properties of the watermark 100 enable improved accuracy in the detection of an embedded watermark in a frame of data, even when the embedded watermark has been "geometrically" altered in some way e.g., rotated, resized, translated, etc.

It is noted that the basic structure of the watermark 100 is given by way of example only and that many variations and modifications may be made to it without departing from the scope of the invention. For robustness, it is preferred that the watermark 100 be formed by blocks of data, e.g., data blocks 102, that exhibit certain properties. For example, it is preferred that each data block 102 contain values that are substantially equal (e.g., constant) along any radius from a center of the data block 102 to its boundary (or perimeter). For example, the data blocks 102A and 102B of FIGS. 2A and 2B are either +1 or −1 along any such radius. As will be apparent from the disclosure herein, this ensures robustness in detecting an embedded watermark despite resizing (e.g., increasing magnification, decreased magnification, changes in aspect ratio, etc.).

Figure 3:
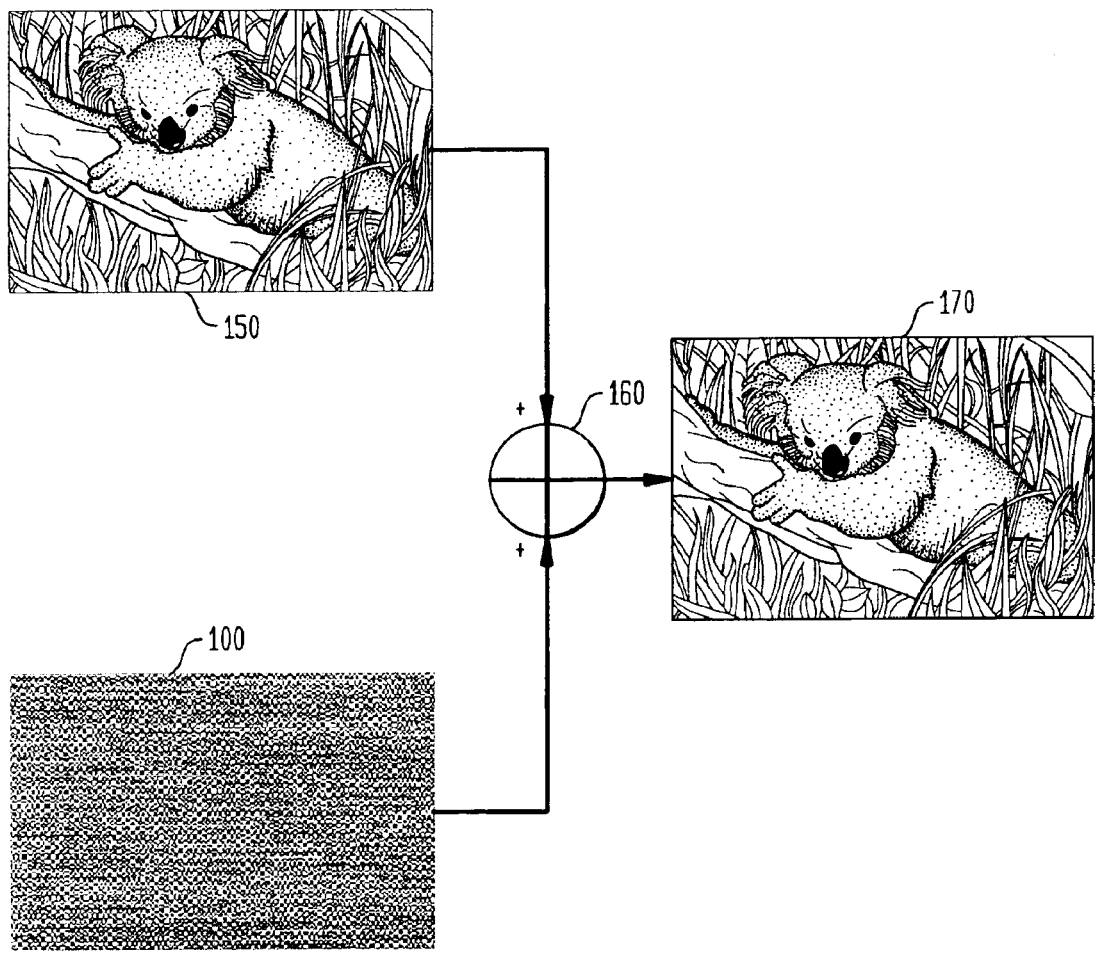
FIG. 3 is a conceptual block diagram illustrating the process of embedding the watermark of FIG. 1 into a frame of data.

Reference is now made to FIG. 3, which is a conceptual block diagram illustrating the process of embedding the watermark 100 of FIG. 1 into a frame of content data, such as video data 150. In general, a basic embedder 160 may be employed to aggregate (e.g., add) the data of the watermark 100 to the pixel data of the frame of video data 150 on a pixel-by-pixel basis to obtain a frame of data 170 that includes a plurality of data values comprising the content data and the embedded watermark 100.

Although the watermark 100 is shown as containing a sufficient number of data blocks 102 to cover the entire frame of video data 150, any size of watermark 100 may be employed without departing from the scope of the invention. For example, the watermark 100 may be smaller than the frame of video data 150 and/or it may be distributed among a plurality of frames of video data 150. For example, when the frame of video data 150 represents one frame among a plurality of frames of a moving video image, the watermark 100 may be distributed among one or more of the frames of video data. In any case, it is preferred that the embedded watermark 100 is not detectable by the human eye in the two-dimensional frame of data 170.

Figure 4:
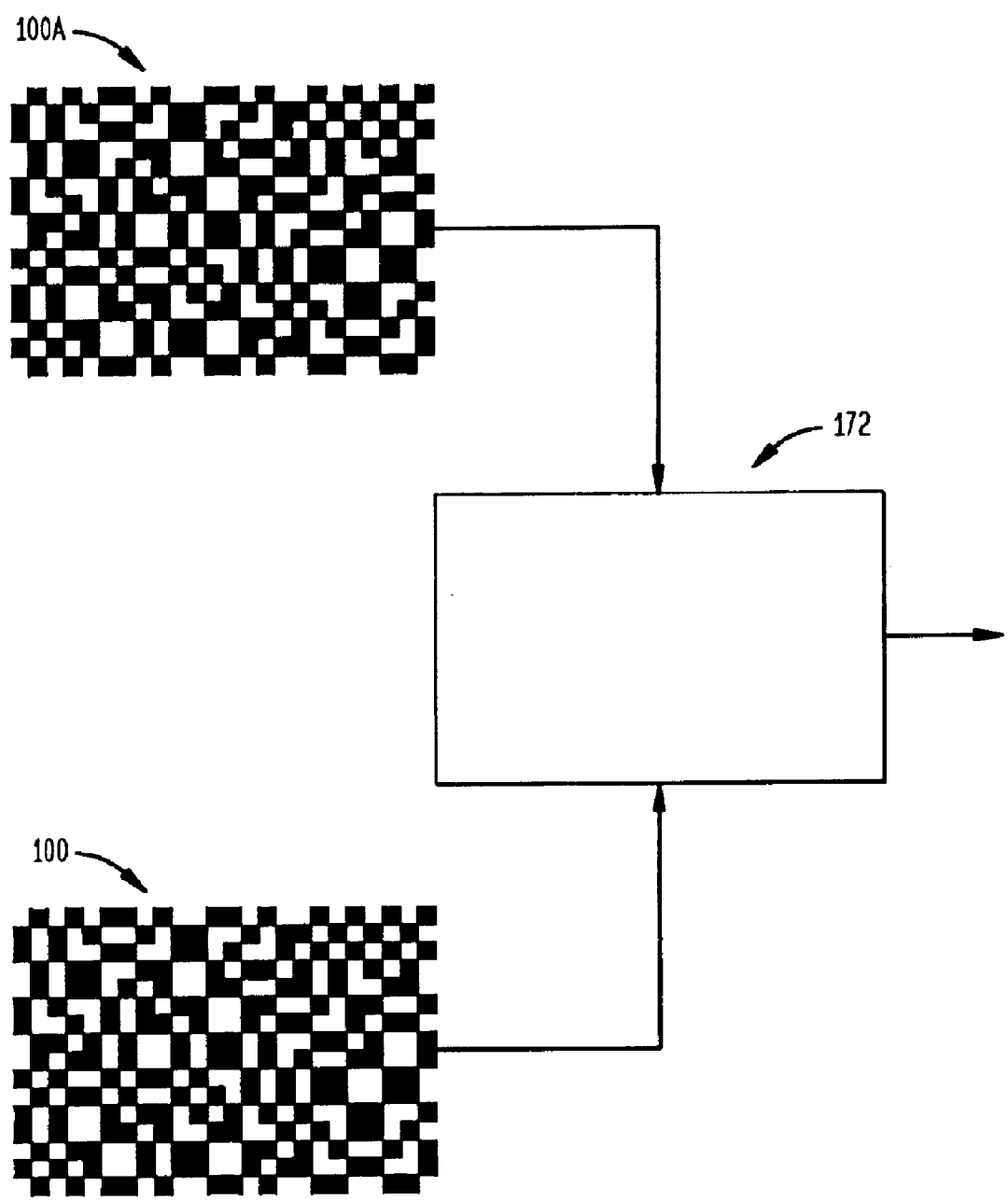
FIG. 4 is a graphical block diagram illustrating how an embedded watermark contained in a frame of data may be correlated with a reference watermark.
Figure 5:
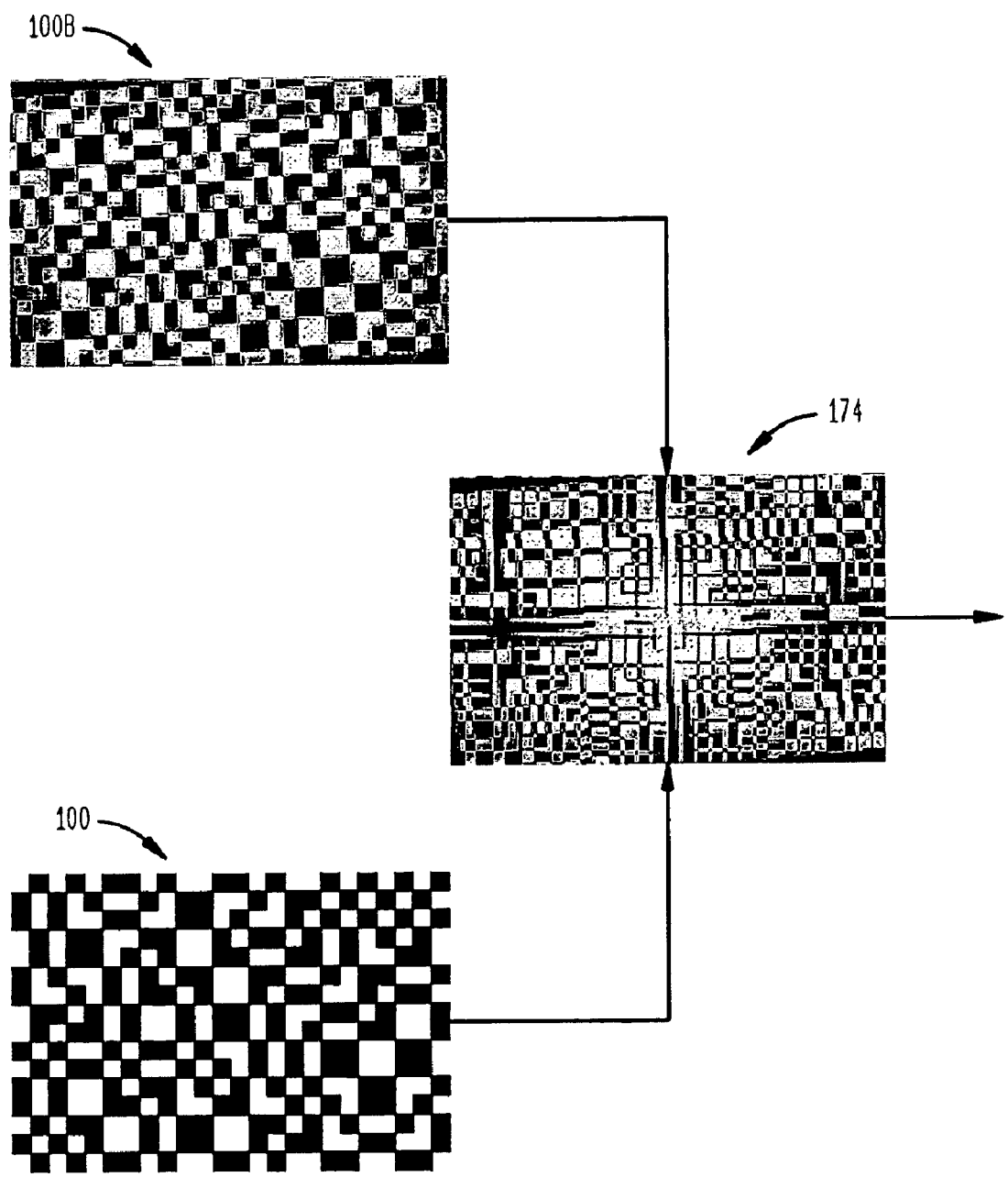
FIG. 5 is a graphical illustration showing how a misalignment between an embedded watermark (e.g., contained in a rotated frame of data) affects correlation with the reference watermark.

With reference to FIG. 4, a graphical block diagram is shown illustrating how an embedded watermark 100A contained in a frame of content data, such as frame 170, may be correlated with the reference watermark 100. It is understood that the embedded watermark 100A is shown without the accompanying content data of the video image for the purposes of discussion. It is intended that the embedded watermark 100A has not been rotated, resized, or translated from its expected position. Thus, the alignment between (or registration of) the embedded watermark 100A and the reference watermark 100 is exact. Thus, the contribution by the data values of the embedded watermark 100A to the product of the data values (i.e., pixel values) of the frame of data 170 and the corresponding data values of the reference watermark 100 will be maximized (e.g., shown as a frame of white points 172). The sum of the products of frame 172 is substantially high when such alignment exists. With reference to FIG. 5, however, a misalignment between a distorted embedded watermark 100B and the reference watermark 100, even when the embedded watermark 100B has only been slightly rotated, resized, and/or translated, results in an array of products 174 that may contain approximately the same number of +1 and −1 products. A sum of the array of products 174 would therefore be relatively low.

In accordance with the invention, however, these basic principles of embedding the watermark 100 and detecting the embedded watermark 100 are expanded upon to advantageously permit detection of the embedded watermark 100 even in the presences of rotation, resizing, and/or translation.

In accordance with at least one aspect of the present invention, an embedded watermark is detected in a two-dimensional frame of data. The content data may be any type of information, such as still video images, moving video images, audio data, etc. The frame of data may be obtained in any way, such as by reading the data from a computer readable medium, receiving the data over a communications channel, etc. If the data are not already organized into a two-dimensional array, then any of the known techniques may be employed to obtain a two-dimensional array from the data. It is noted that the entire watermark may be embedded in a single frame of data or portions thereof may be distributed among a plurality of frames of data without departing from the scope of the invention.

Figure 6:
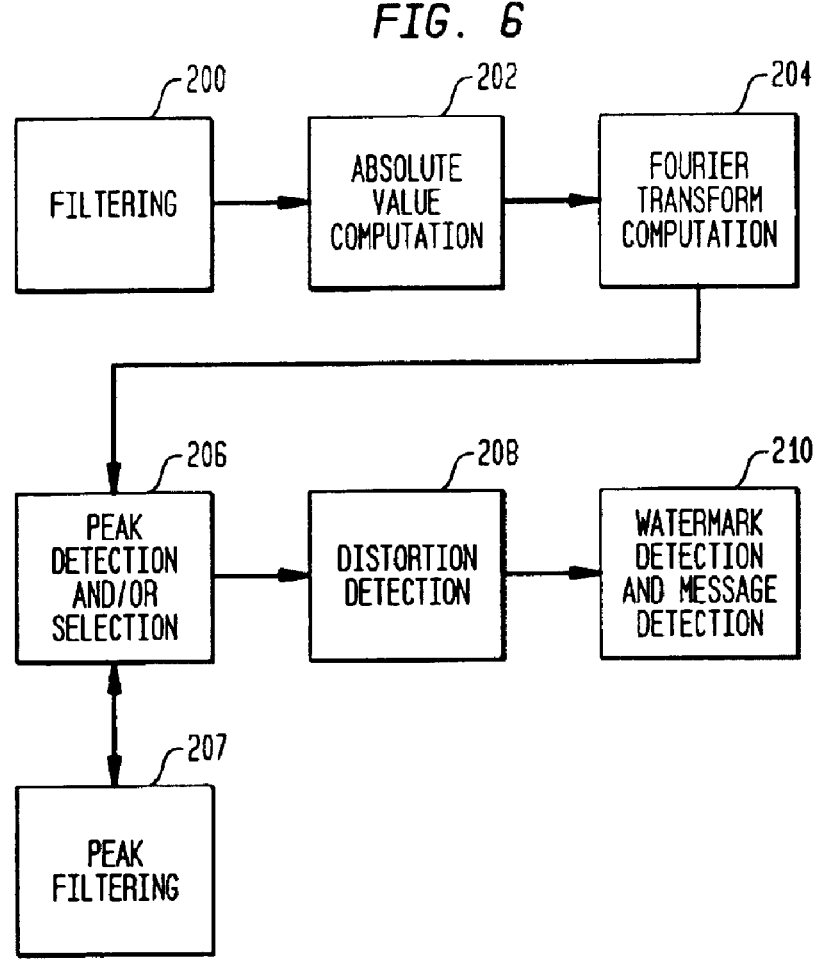
FIG. 6 is a block diagram illustrating certain actions and/or functions that may be carried out in accordance with one or more aspects of the present invention.

Reference is now made to FIG. 6, which is a block diagram illustrating preferred actions and/or functions that may be carried out in accordance with one or more aspects of the present invention. The functions include filtering 200, absolute value computation 202, Fourier transform computation 204, peak detection/selection 206, distortion detection (e.g., rotation, resizing, and translation) 208, and watermark detection 210. These functions may be implemented as an apparatus, for example, by utilizing suitable circuitry and/or they may be implemented utilizing a suitable processing device operating under the control of one or more software programs. Indeed, certain aspects of the invention may be embodied by a storage medium containing a software program that is capable of causing a suitable processor to carry out certain actions, such as those illustrated in FIG. 6 and/or any other actions disclosed hereinbelow. It is noted that the functional blocks shown in FIG. 6 are partitioned for the purposes of clarity, it being understood that the functional blocks may be combined or partitioned in a number of alternative ways without departing from the scope of the invention.

Referring specifically to the filtering function 200, it is preferred that a filtered frame of data is computed from the frame of data (i.e., the content data and embedded watermark) such that certain two-dimensional frequency characteristics of the filtered frame of data are obtained. For example, it is desirable to filter the frame of data such that at least some harmonic frequency components corresponding to the embedded watermark are emphasized as compared to some or all of the frequency components corresponding to the frame of content data.

Figure 7:
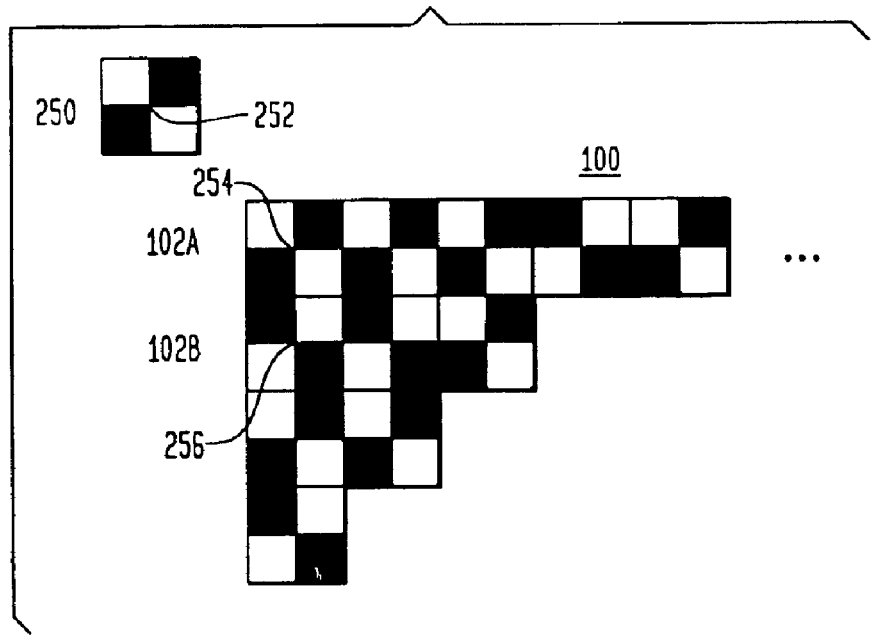
FIG. 7. is a graphical representation illustrating a filtering process that may be utilized in accordance with one or more aspects of the present invention.
Figure 8:
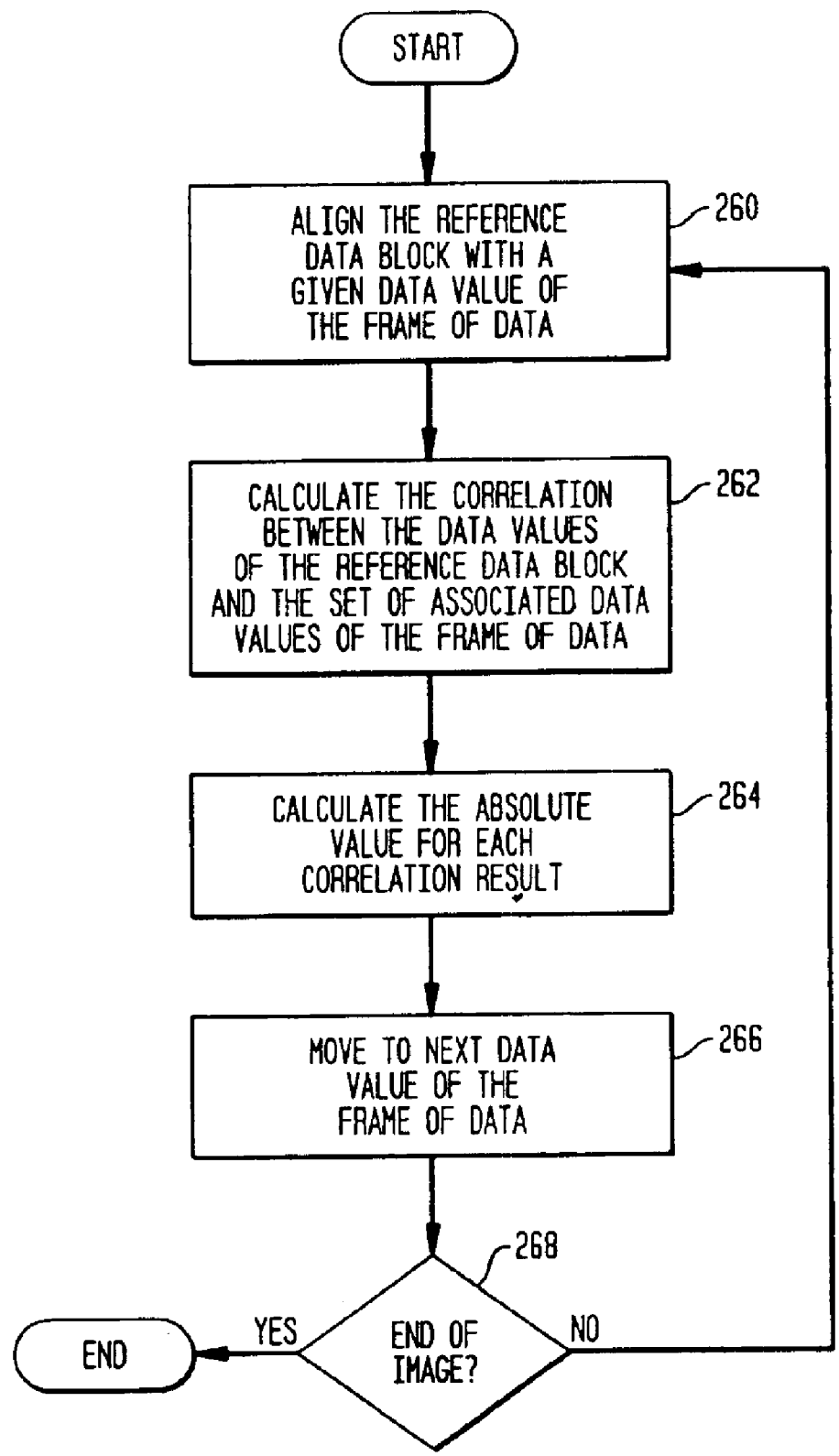
FIG. 8 is a flow diagram illustrating certain actions and/or functions that may be carried out in accordance with the present invention and in conjunction with certain actions and/or functions of FIG. 6.
Figure 9:
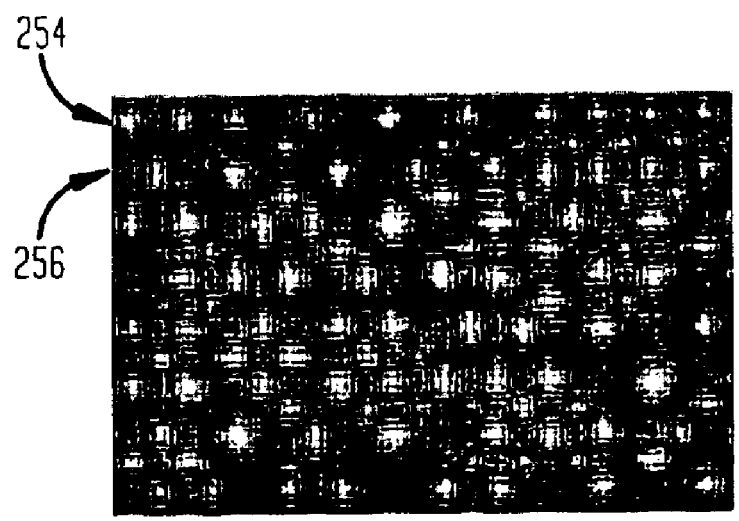
FIG. 9 is a graphical representation of results that may be obtained by carrying out certain of the actions and/or functions of FIG. 8.
Figure 10:
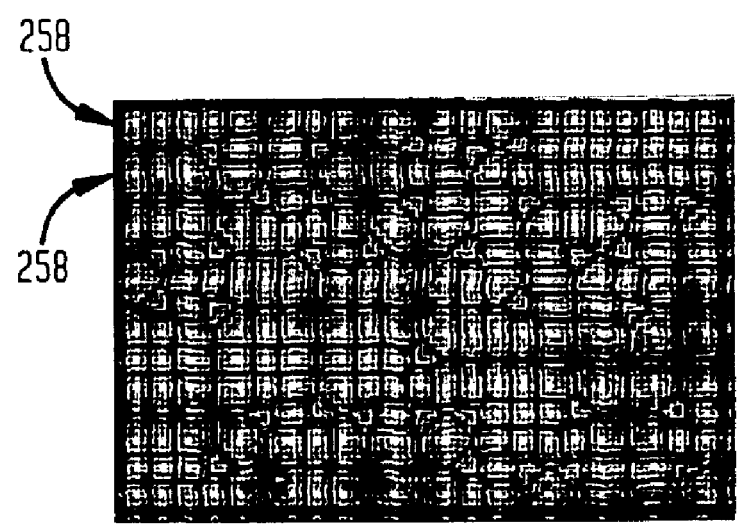
FIG. 10 is a graphical representation of the results that may be obtained by carrying out other actions and/or functions of FIG. 8.

Reference is now made to FIGS. 7–10, which illustrate additional details concerning the filtering process 200 of FIG. 6. FIG. 7 is a graphical illustration of certain aspects of a desirable filtering process 200 suitable for use with the present invention; FIG. 8 is a flow diagram illustrating certain actions/functions that are preferably carried out in accordance with the filtering process 200; and FIGS. 9–10 are graphical representations of results that may be obtained thereby.

With reference to FIGS. 7 and 8, a reference data block 250 is positioned over (and preferably centered over) each data value of a frame of data comprising an embedded watermark 100 (action 260). For the purposes of clarity, only the embedded watermark 100 is shown in FIG. 7, without showing the content data. It is also noted that the embedded watermark 100 is shown in a non-distorted state (i.e., no rotation, resizing, translation, etc.), although it is understood that the invention contemplates the detection of an embedded watermark 100A that has been distorted in some way.

The reference data block 250 preferably includes an array of data values (such as pixel values, audio values, etc.) arranged in one of the patterns found in the reference watermark 100 (and expected in the embedded watermark 100). For example, the reference data block 250 may include data values arranged in one of the first and second patterns shown in FIGS. 2A and 2B. As shown, the reference data block 250 includes data values arranged in the first pattern (FIG. 2A).

At action 262, a sum-of-products of the data values of the reference data block 250 and a respective set of data values of the frame of data (e.g., the set of data values that are covered by the reference data block 250) is computed. In other words, for each alignment position of the reference data block 250 over a portion of the frame of data containing the embedded watermark 100, a one-for-one sum-of-products computation is made. By way of example, the results of computing the sum-of-products in action 262 is graphically shown in FIG. 9, where larger magnitude results are either very bright (e.g., white) or very dark (e.g., black).

When a center 252 of the reference data block 250 is positioned over a data value located at a center 254 of, for example, a data block 102A of the frame of data having the first pattern, the result of the sum-of-products between the values of the reference data block 250 and the respective set of values of the frame of data (action 262) is a relatively high and positive magnitude. With reference to FIG. 9, this result is graphically shown at position 254 as being bright white.

When the center 252 of the reference data block 250 is aligned with a center 256 of a data block 102B of the second pattern, the result of the sum-of-products computation is a relatively large negative number. With reference to FIG. 9, this result is graphically shown at position 256 as being very dark, i.e., black. It is noted that the graphical array shown in FIG. 9 is representative of numerical results, which have been presented as contrasting shades of black, gray, and white for purposes of discussion only.

With reference to FIG. 8, the absolute value of each of the sum-of-products computed in action 262 is taken (action 264). (It is noted that action 264 corresponds to action/function 202 of FIG. 6.) The computations of actions 262 and 264 are performed on each data value of the frame of data by moving to the next data value (action 266) and testing for the end of the frame of data (action 268). As shown in FIG. 10, taking the absolute value of each of the sum-of-products computation results in an array of numbers that appears as a geometric pattern of peaks, e.g., bright white points 258. Each peak represents a center of a data block 102 of the embedded watermark 100 irrespective of whether the data block 102 is of the first or second pattern.

Referring again to FIG. 6, the Fourier transform computation 204 preferably includes the action of computing a two-dimensional Fourier transform on the filtered frame of data to produce a two-dimensional frequency spectrum of the filtered frame of data. Any of the known techniques may be employed to compute the two-dimensional Fourier transform, such as utilizing any of the well known Fast Fourier transform (FFT) algorithms.

Figure 11:
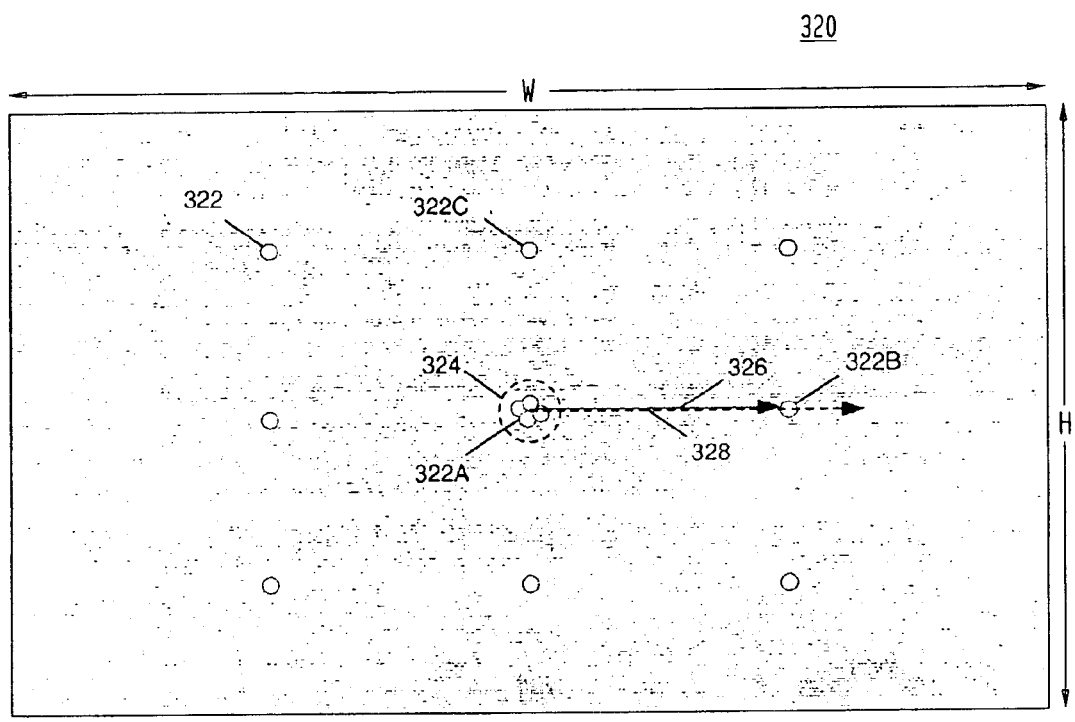
FIG. 11 is a graphical illustration showing an example of a two-dimensional Fourier transform of a filtered frame of data in accordance with certain aspects of the present invention, where the embedded watermark has not been subjected to rotation.

FIG. 11 shows an example of a two-dimensional frequency spectrum 320 of a filtered frame of data, such as the filtered frame of data shown in FIG. 10. The two-dimensional spectrum 320 includes a number of peaks 322, shown schematically as white circles among a larger number of lower magnitude values, shown schematically by way of gray dots. The peaks 322 represent the magnitude and phase components of some of the harmonic frequency components corresponding to the embedded watermark 100. It is understood that an actual two-dimensional frequency spectrum would include many more peaks 322 than those shown in FIG. 12, but for simplicity they have been omitted. Like the embedded watermark 100 itself, the Fourier transform (in this case an FFT) of the filtered frame of data includes certain geometric properties derived from the embedded watermark 100. In particular, at least some of the harmonic frequency components 322 of the spectrum 320 are located in a rectangular pattern around an origin 324. The origin 324 represents one or more low frequency components, such as DC. Assuming that the frequency spectrum 320 is disposed in a Cartesian coordinate system having x and y axes intersecting at the origin 324, each of the harmonic frequency components 322 may be expressed as an x, y coordinate pair.

With reference to FIG. 6, it is preferable that the peak detection and/or selection function 206 is associated with a filtering function 207. The filtering function 207 is preferably operable to perform one or more filtering algorithms in order to suppress undesired peaks 322 in the two-dimensional frequency spectrum 320 of the filtered frame of data. For example, with reference to FIG. 11, sometimes many peaks 322A appear near the origin 324. As such peaks 322A contain little information concerning whether or not the embedded watermark 100 has been rotated, resized, or translated, etc., they are generally of little value and may be discarded or ignored.

In accordance with the peak detection/selection function 206 (FIG. 6), it is preferred that at least some of the lower harmonic frequency components 322 (FIG. 11) corresponding to the embedded watermark 100 are selected from among the plurality of peaks 322 contained in the two-dimensional frequency spectrum 320. For example, the first harmonic frequency components, and/or the second harmonic frequency components would be suitable for selection in accordance with some aspects of the invention. It is most preferred that the harmonic frequency components 322 corresponding to the second harmonics of the embedded watermark 100 are selected for use in accordance with the present invention. By way of example, the harmonic frequency components 322 shown in FIG. 11 (with the exception of those grouped about the origin 324) represent the second harmonic frequency components corresponding to the embedded watermark 100. As will become apparent from the discussion below, only some of the selected harmonic frequency components 322 shown in FIG. 11 need be analyzed to determine whether and how the embedded watermark 100 is distorted.

Referring to FIGS. 6 and 11, at least one of the rotation value, resizing value, and the translation value associated with the embedded watermark 100 are preferably determined by the distortion detection function 208. These values are determined by computing one or more deviations of the geometric positions of the selected harmonic frequency components 322 corresponding to the embedded watermark 100 or by computing one or more deviations in the phases of the selected harmonic frequency components 322.

The deviations of the geometric positions or the phases of the selected harmonic frequency components 322 corresponding to the embedded watermark 100A may be determined by exploiting certain general properties of a two-dimensional Fourier transform. These properties include that any rotation of a frame of data by a rotation value (i.e., an angle) will result in a corresponding rotation of the frequency components of the Fourier transform of the frame of data. Here, a corresponding rotation of the harmonic frequency components corresponding to the embedded watermark 100 would be evident. Another property of the two-dimensional Fourier transform is that any resizing, e.g., magnification or reduction, of the frame of data in the x-direction (i.e., along the x-axis) will result in an inversely proportional resizing of the positions of the frequency components of the Fourier transform. Here, the harmonic frequency components 322 corresponding to the embedded watermark 100 will be repositioned relative to the origin 324 as a result of resizing. For example, any resizing of the frame of data in the x-direction (i.e., along the x-axis) results in an inversely proportional resizing in the x-direction of the positions of the harmonic frequency components 322 of the embedded watermark 100 relative to the origin 324. Similarly, any resizing of the frame of data in the y-direction (i.e., along the y-axis) results in an inversely proportional resizing in the y-direction of the positions of the harmonic frequency components 322 of the embedded watermark 100 relative to the origin 324. Still further, the general properties of the two-dimensional Fourier transform provide that any translation (i.e., spatial shift) of the frame of data results in a corresponding change in the phase components of the frequency components of the Fourier transform without changing the magnitudes thereof. Here, the harmonic frequency components 322 of the embedded watermark 100 will exhibit phase irregularities from such transformations. These properties will be discussed in more detail hereinbelow.

Figure 12:
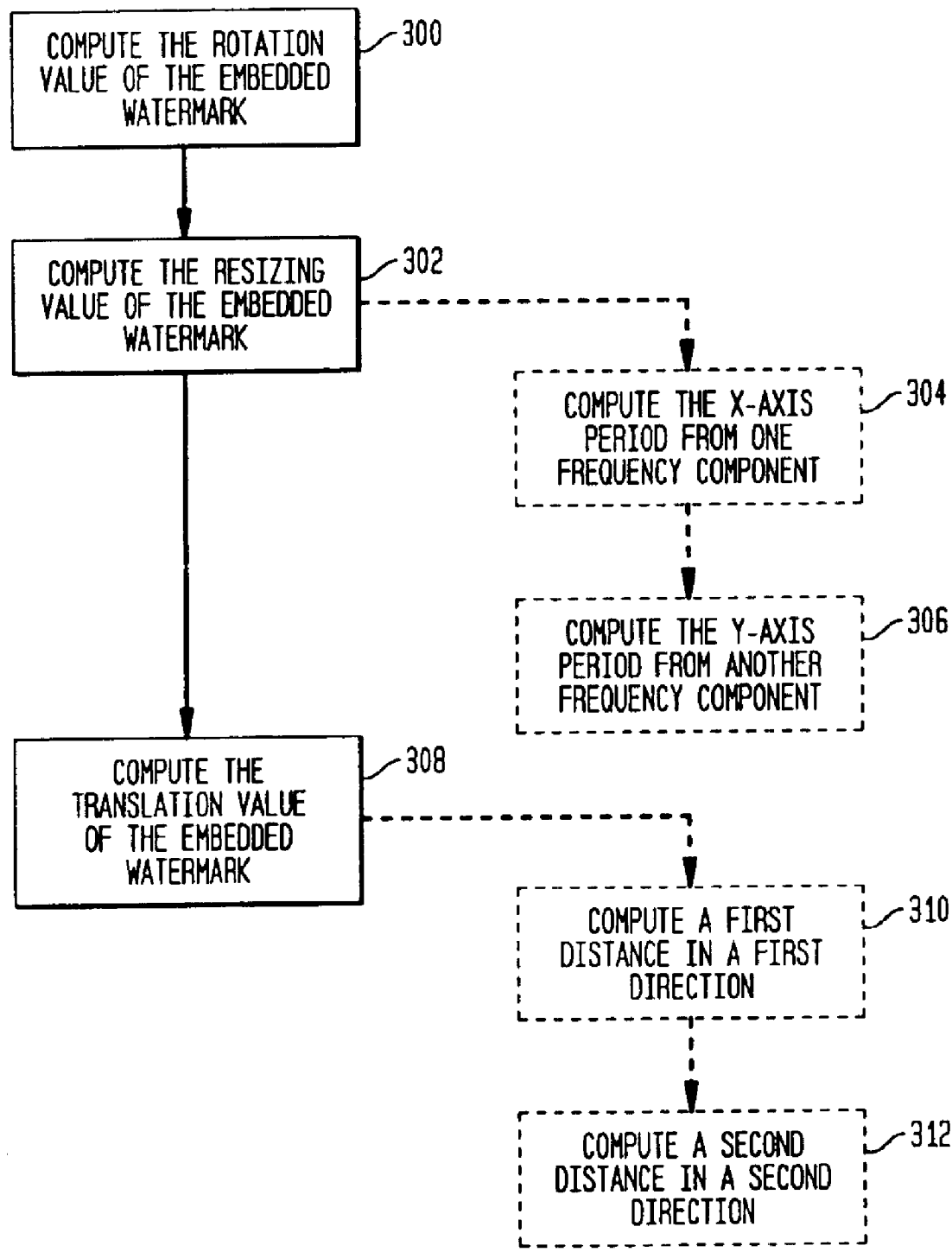
FIG. 12 is a flow diagram illustrating certain actions and/or functions that may be carried out in accordance with the present invention and in accordance with the distortion detection actions and/or functions of FIG. 6.

Reference is now made to FIG. 12, which is a flow diagram illustrating certain actions and/or functions that may be carried out in accordance with the distortion detection function 208 of FIG. 6. At action 300, a determination of the rotation value corresponding to the embedded watermark 100 is computed by determining deviations of the geometric positions of at least some of the selected harmonic frequency components 322. With further reference to FIG. 11, the rotation value may be determined by computing an angle between a first axis 326 and a reference axis 328. The first axis 326 extends from a reference point, such as the origin 324, to at least one of the selected harmonic frequency components 322, such as component 322B. The reference axis 328 is defined by the reference watermark 100 and preferably extends along one of the x and y axes.

Preferably, the rotation value corresponding to the embedded watermark 100 is determined by computing a numerical value substantially proportional to:

$$\arctangent((Fy1*W)/(Fx1*H)),$$

where Fy1 and Fx1 are the y-axis and x-axis coordinates, respectively, of one of the selected harmonic frequency components 322 corresponding to the embedded watermark 100, such as the component 322B in FIG. 11. It is most preferred that the rotation value corresponding to the embedded watermark 100 is determined by computing a numerical value substantially equal to:

$$(180/n)*\arctangent((Fy1*W)/(Fx1*H)).$$

By way of example, the y-axis coordinate of the harmonic frequency component 322B, Fy1, is zero and the x-axis coordinate, Fx1, is some positive number. Thus, the argument of the arctangent function is zero and the resultant rotation value (angle) is zero. The x, y position of the peak 322B reveals that the embedded watermark 100 (FIG. 7) might not have been rotated. Although in this example the resultant rotation angle was zero, it is understood that this result represents the rotation of the frame of data (and embedded watermark 100A) modulo 90°. Thus, the actual distortion of the embedded watermark 100 due to rotation could be 0+n*90°, where n=0, 1, 2, . . . Resolving this issue is dealt with in more detail below when detecting the hidden message in the embedded watermark 100 is discussed. It is noted here, however, that a pirate is unlikely to rotate a frame of data by 90° because it would probably render the content data unsuitable for enjoyment.

Figure 13:
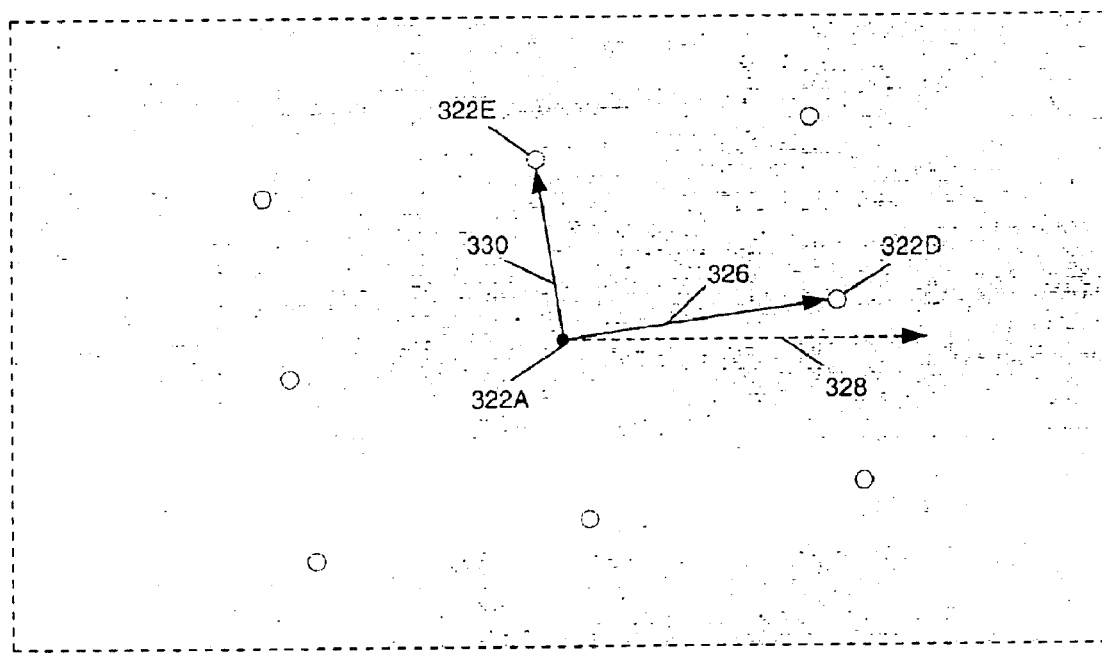
FIG. 13 is a graphical illustration showing an example of a two-dimensional Fourier transform of a filtered frame of data in accordance with certain aspects of the present invention, where the embedded watermark has been at least rotated.

FIG. 13 is an example of a two-dimensional Fourier transform 320A of a filtered frame of data in which the embedded watermark 100 has been at least rotated. Here, the argument of the arctangent function is approximately 0.2 and the resultant rotation value (angle) is approximately 12°. Again, the rotation value represents the rotation of the frame of data and the embedded watermark 100 modulo 90°. Thus, the actual distortion of the embedded watermark 100A due to rotation could be 12°+n*90°, where n=0, 1, 2, . . .

It is noted that the action and/or function of computing the rotation value of the embedded watermark (action 300, FIG. 12) may involve computing a rotation value for two or more of the selected harmonic frequency components 322 and selecting one of the rotation values from among those computed. Alternatively, some or all of the computed rotation values may be aggregated in some way, for example, by averaging them to obtain a final rotation value.

Referring again to FIG. 12, at action 302 the resizing value corresponding to the embedded watermark 100 is computed by determining other deviations of the geometric positions of at least some of the selected harmonic frequency components 322. This preferably involves comparing a period, P, of at least one of the selected harmonic frequency components 322 of the embedded watermark 100 and a reference period, Pr, defined by the reference watermark 100.

It is most preferred that the determination of the period P is separated into a determination of an x-axis period, Px (action 304), and a determination of a y-axis period, Py, (action 306). The x-axis period Px is preferably computed from the geometric position of one of the selected harmonic frequency components 322. The y-axis period Py is preferably computed from the geometric position of another one of the selected harmonic frequency components 322. Preferably, the selected harmonic frequency component used to compute the x-axis period Px is one that either lies substantially along the x-axis or would lie substantially along the x-axis but for any distortion due to rotation.

With reference to FIG. 13 and by way of example, when the embedded watermark 100A has been distorted by way of rotation, the harmonic frequency component 322D is preferably selected to determine the x-axis period Px because it would have fallen substantially along the x-axis but for the rotation. Preferably, the selected harmonic frequency component used to compute the y-axis period Py is one that lies substantially along the y-axis or would lie substantially along the y-axis but for any distortion due to rotation. As shown in FIG. 13, the harmonic frequency component 322E is preferably selected to determine the y-axis period Py because it would have fallen substantially along the y-axis but for the rotation.

The resizing value is preferably determined by computing an x-axis resizing value and a y-axis resizing value from the x-axis period Px and the y-axis period Py, respectively. This advantageously provides information concerning enlargement of, reduction of, and/or aspect ratio changes of (i.e., enlarging or reducing one or the other of the x-axis and y-axis dimensions of) the embedded watermark 100A.

The x-axis resizing value is preferably determined by computing a ratio of the x-axis period Px and an x-axis reference period, Prx, defined by the reference watermark 100. The x-axis period Px is preferably determined by computing a numerical value that is substantially equal to:

$$(H*W)/\sqrt{((Fx1*H)^2+(Fy1*W)^2)},$$

where Fx1 and Fy1 are the x-axis and y-axis coordinates, respectively, of the selected harmonic frequency component (e.g., 322D) corresponding to the embedded watermark 100, H is the total y-axis dimension of the two-dimensional Fourier transform 320A, and W is the total x-axis dimension of the two-dimensional Fourier transform 320A. The x-axis reference period Prx of the reference watermark 100 is preferably determined by examining certain geometric properties of the data blocks of the reference watermark 100. With reference to FIG. 2A, the reference watermark 100 includes a plurality of two-dimensional data blocks 102, each data block 102 including a plurality of data values arranged in rows and columns. The number of data values in each of the rows is equal to the x-axis reference period Prx of the reference watermark 100.

Determining the y-axis resizing value preferably includes the computation of a ratio of the y-axis period Py to a y-axis reference period, Pry, defined by the reference watermark 100. The y-axis period Py is preferably determined by computing a numerical value that is substantially equal to:

$$(H*W)/\sqrt{((Fx2*H)^2+(Fy2*W)^2)},$$

where Fx2 and Fy2 are the x-axis and y-axis coordinates, respectively, of another of the selected harmonic frequency components (e.g., 322E), corresponding to the embedded watermark 100. With reference to FIG. 2A, the number of values in each of the columns of the data blocks 102 is equal to the y-axis reference period Pry of the reference watermark 100.

With reference to FIG. 12, the action and/or function of computing the translation value of the embedded watermark 100 (action 308) is preferably determined by computing one or more deviations in the phases of at least some of the selected harmonic frequency components 322 corresponding to the embedded watermark 100. More particularly, the determination of the translation value of the embedded watermark 100 preferably includes obtaining phases from at least two of the selected harmonic frequency components 322.

Preferably, determining the translation value of the embedded watermark 100 includes computing a first distance (based on one of the phases) in a first direction (action 310) and computing a second distance (based on another of the phases) in a second direction (action 312). The first distance represents an amount that the embedded watermark 100 has been translated (or shifted) and the first direction is the direction of that translation. The second distance represents another amount that the embedded watermark 100 has been translated and the second direction is the direction of that translation. It is most preferable that the first and second distances lie along axes that are orthogonal to one another. For example, one of the first and second directions preferably lies along an axis that runs at an angle with the x-axis or the y-axis, where the angle corresponds to the rotation value. The other of the first and second directions preferably lies along an axis perpendicular thereto.

The first distance is preferably obtained by computing a numerical value that is proportional to a first phase, θ1, of a first one of the selected harmonic frequency components (e.g., component 322D of FIG. 13). The second distance is preferably obtained by computing a numerical value proportional to a second phase, θ2, of a second one of the selected harmonic frequency components (e.g., component 322E of FIG. 13).

Preferably, the first distance is obtained by computing a numerical value that is substantially equal to:

$$(\theta 1 * H * W)/2\pi * \sqrt{((Fx1*H)^2 + (Fy1*W)^2)},$$

where Fx1 and Fy1 are the x-axis and y-axis coordinates, respectively, of the first one of the selected harmonic frequency components (e.g., component 322D).

The second distance is preferably obtained by computing a numerical value substantially equal to:

$$(\theta 2 * H * W)/2\pi * \sqrt{((Fx2*H)^2 + (Fy2*W)^2)},$$

where Fx2 and Fy2 are the x-axis and y-axis coordinates, respectively, of the second one of the selected harmonic frequency components (e.g., component 322E).

As discussed above, the first direction preferably lies along an axis defined by the rotation value that may have been computed at action 300 of FIG. 12. More particularly, the first direction is preferably determined by computing a numerical value that is substantially proportional to:

$$\arctan((Fy1*W)/(Fx1*H)).$$

Similarly, the second direction preferably lies along an axis defined by the rotation value that may have been previously determined at action 300 of the FIG. 12. More particularly, the second direction is preferably obtained by computing a numerical value that is substantially proportional to:

$$\arctan((Fy2*W)/(Fx2*H)).$$

Figure 14:
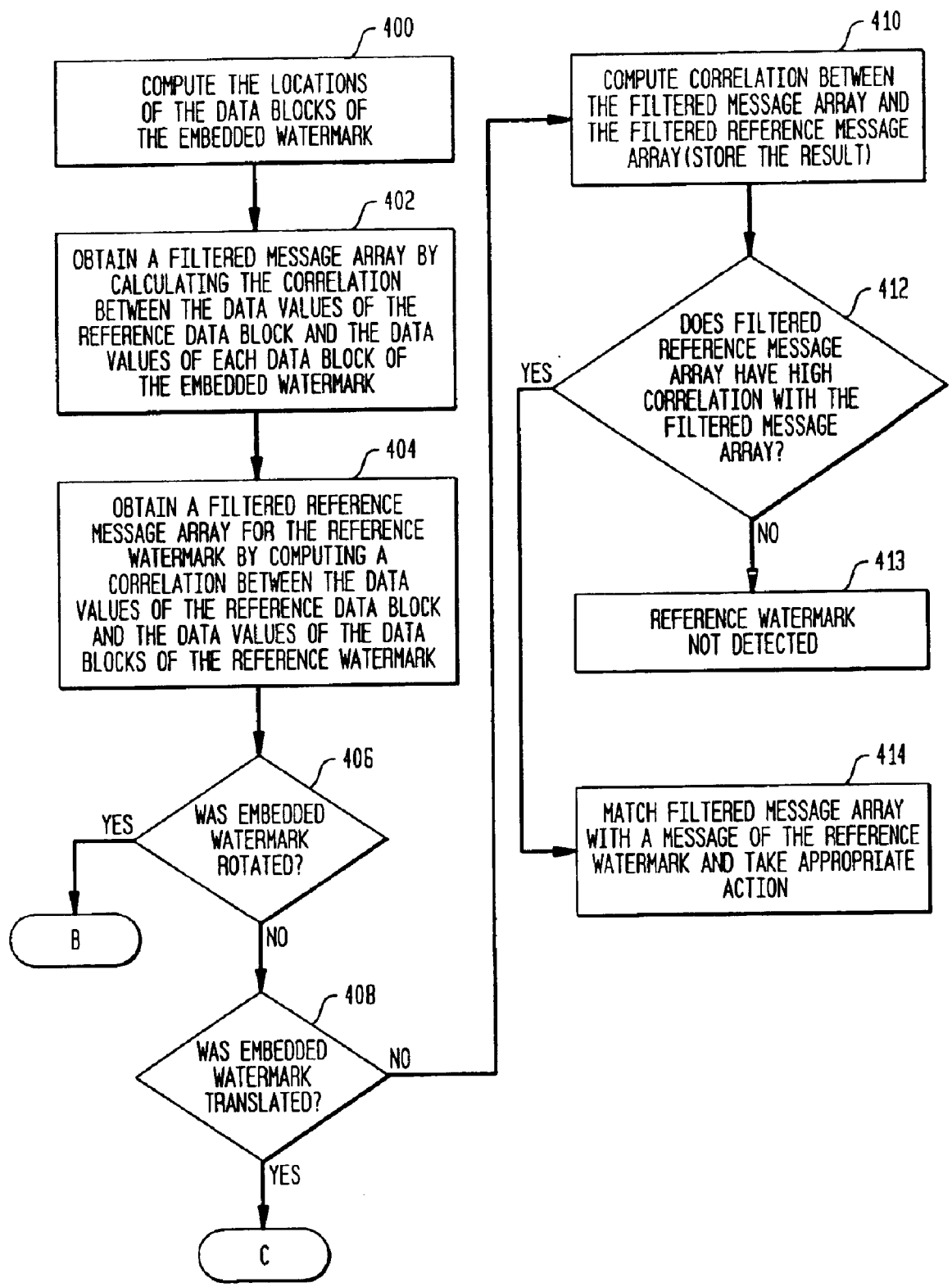
FIG. 14 is a flow diagram illustrating certain actions and/or functions that may be carried out in accordance with certain aspects of the invention in order to detect an embedded watermark in a frame of data that has been at least one of rotated, resized, and translated.

With reference to FIG. 6, once the distortion in the embedded watermark 100 is determined (action 208), the embedded watermark 100 and its hidden message are detected (action 210). FIG. 14 is a flow diagram illustrating more detailed actions and/or functions that may be carried out in accordance with at least one aspect of the present invention in order to detect the embedded watermark 100 and its hidden message in accordance with action 210 of FIG. 6. At action 400, the locations within the frame of data corresponding to at least some of the data blocks 102 of the embedded watermark 100 are determined, preferably in accordance with at least one of the previously determined rotation value, the resizing value, and the translation value of the embedded watermark 100. It is most preferred that the locations correspond to respective centers of the data blocks 102 of the embedded watermark 100.

At action 402, a filtered array of message values is determined, where each filtered message value corresponds with one of the data blocks 102 of the embedded watermark 100 for which a location was determined. Preferably, each filtered message value is substantially equal to a correlation between (e.g., a sum-of-products of) the data values of the reference data block 250 and a respective set of data values of a given one of the data blocks 102 of the embedded watermark 100. This respective set of data values of a given data block 102 are preferably those data values covered by the reference data block 250 when the center 252 (FIG. 7) thereof is aligned with the respective location (e.g., the center) of the data block 102 of the embedded watermark 100.

It is noted that the filtered message values are contained within the filtered frame of data that was discussed hereinabove with respect to FIGS. 6–10. Indeed, the filtered message values would ideally correspond to each of the peaks 254, 256, etc. contained in the filtered frame of data (FIG. 9). Thus, recalculation of the filtered message values need not be conducted; rather, they may be extracted from the filtered frame of data. Alternatively, the filtered message values may be calculated in another way, namely, the reference data block 250 may be rotated by an amount proportional to the rotation value prior to taking the correlation, e.g., a sum-of-products, between the reference data block 250 and the respective sets of data values of the data blocks of the embedded watermark 100. Yet another alternative (or additional aspect) to determining the filtered message values includes resizing the reference data block 250 by one or more amounts in proportion to the resizing value (e.g., the x-axis value and the y-axis value) prior to taking the sum-of-products. Theoretically, these alternative techniques would yield a more accurate filtered array of message values.

At action 404, a filtered array of reference message values is preferably obtained, where each filtered reference message value corresponds to one of at least some of the data blocks 102 of the reference watermark 100. In particular, each filtered reference message value is substantially equal to a sum-of-products of the data values of the reference data block 250 and the data values of the data blocks 102 of the reference watermark 100. Preferably, the filtered array of reference message values is predetermined and may be readily obtained by reading the array from an appropriate storage device.

At action 406, a determination is preferably made as to whether or not the embedded watermark 100 has been subject to distortion by rotation. This may readily be determined by analysis of the rotation value. If it can be determined that the embedded watermark 100 was not rotated, then the process flow preferably advances to action 408. There, a determination is preferably made as to whether or not the embedded watermark 100 was subject to distortion by translation. If that determination is negative, the process flow preferably advances to action 410, where a correlation between the filtered array of message values and the filtered array of reference message values is computed. In particular, the correlation computation preferably involves taking a sum-of-products of the filtered array of message values and the filtered array of reference message values. A determination that the embedded watermark 100 contains a message that corresponds with a message of the reference watermark 100 is preferably made when the sum-of-products meets or exceeds a threshold (actions 412 and 414). Appropriate action may then be taken.

It is noted that any number of different reference watermarks may be employed in accordance with the invention. The embedded watermark 100 may be matched to one of the reference watermarks in accordance with another aspect of the invention by: (i) determining a set of filtered arrays of reference message values at action 404; (ii) computing a separate sum-of-products of the filtered array of message values and each of the filtered arrays of reference message values at action 410; and (iii) determining that the embedded watermark 100 contains a message that corresponds with a message of one of the reference watermarks when one of the sum-of-products of the filtered array of message values and the filtered array of reference message values associated with the one reference watermark meets or exceeds a threshold at actions 412, 413 and 414.

Figure 15:
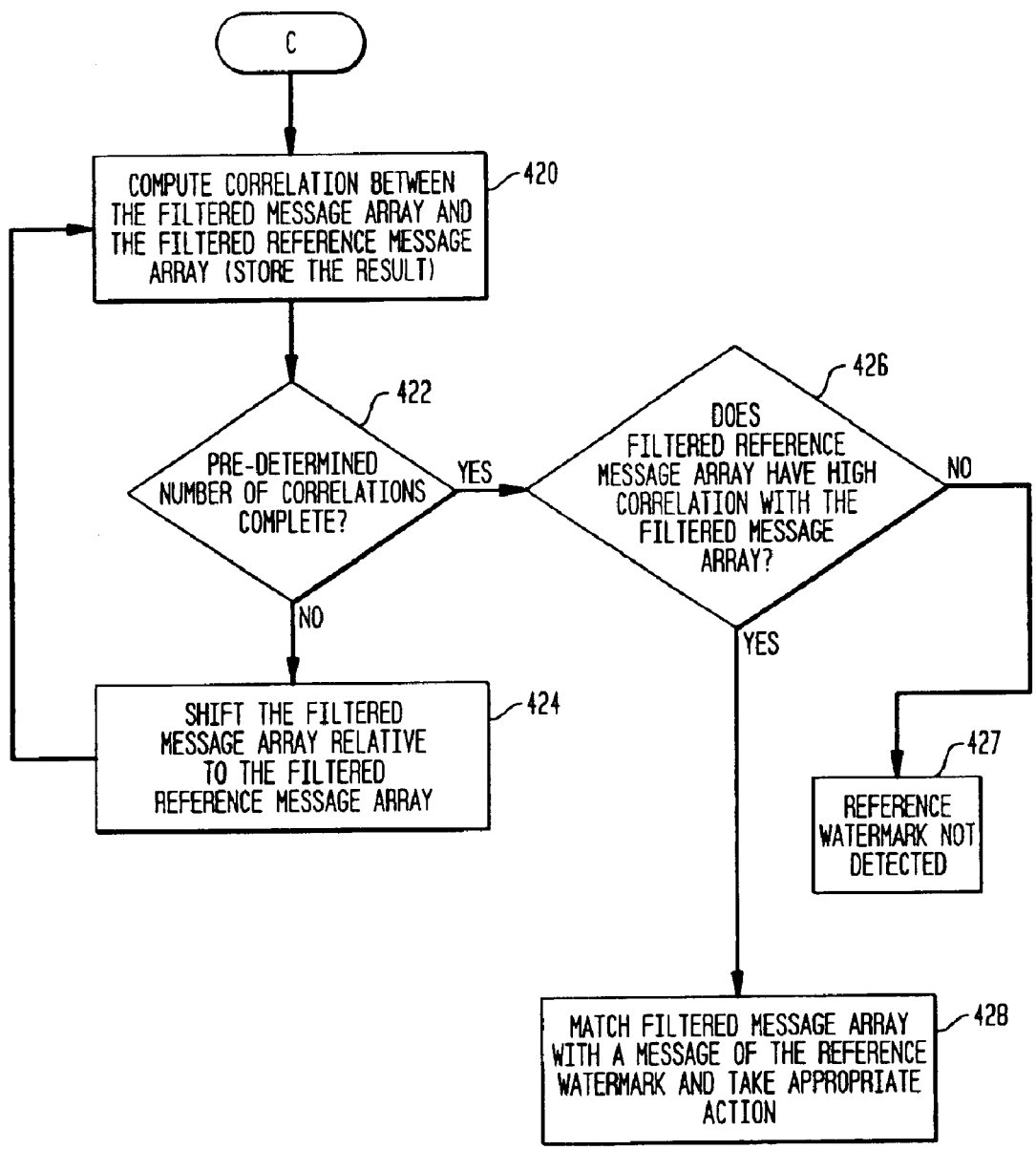
FIG. 15 is a flow diagram illustrating further actions and/or functions that may be carried out in addition to those shown in FIG. 14.

Turning again to action 408, if it is determined that the embedded watermark 100 was subjected to distortion via translation, then the process flow preferably branches to action 420 (FIG. 15) where, as was the case with action 410, a correlation between the filtered array of message values and the filtered array of reference message values is obtained, for example, by way of taking a sum-of-products. Preferably, the result of the correlation computation is stored. Assuming that a predetermined number of correlations have not yet been computed (action 422), the process flow preferably advances to action 424 where the filtered array of message values and the filtered array of reference message values are translated with respect to one another by an integer number of message value locations horizontally and/or vertically. A correlation between the filtered array of message values and the filtered array of reference message values is again computed and stored (action 420). These steps are preferably repeated until a predetermined number of correlations are computed (action 422), for example, ten correlations. Then, the process flow preferably advances to where a determination is preferably made as to whether the embedded watermark 100A contains a message that corresponds to the message of the reference watermark 100 by determining whether one of the correlation results meets or exceeds a threshold (actions 426, 427 and 428).

The above steps of translating and correlating are repeated because the computed translation value(s) (e.g., the first distance in the first direction and/or the second distance in the second direction) represent modulo value(s) of translation, as opposed to the actual translation. Without reference to the actual embedded reference message arrays, only translation values that are modulo the resized dimensions of an embedded block of the watermark can be computed. These modulo values along with the resizing and rotation values, permit the "grid" of block locations in the distorted embedded watermark to be computed. By computing several correlations with different offsets between the embedded and reference message arrays, more reliable determination(s) of the translation value and whether the embedded watermark 100 matches with the reference watermark 100 may be obtained.

Referring again to action 406 (FIG. 14), if it is determined that the embedded watermark 100A was subject to distortion via rotation, then the process flow preferably branches to action 452 (FIG. 16). There, a correlation (e.g., a sum-of-products) between the filtered array of message values and the filtered array of reference message values is preferably obtained and the results stored.

The filtered array of message values and the filtered array of reference message values are preferably rotated again with respect to one another by 90° at action 454. At action 456, a decision is preferably made as to whether or not the arrays have been rotated by 360° with respect to one another. If not, then the process preferably flows back to action 452 where another correlation between the filtered array of message values and the filtered array of reference message values is computed and the result stored. This process is preferably repeated until a rotation of 360° is reached at action 456. The process flow then preferably advances to action 458, where a determination is preferably made as to whether or not the embedded watermark 100 corresponds with the reference watermark 100. If correspondence exists, the process preferably flows to action 460, if not, then the process preferably flows to action 459 (no watermark is detected). A correspondence is assumed when one of the correlation results (e.g., one of the sum-of-products) meets or exceeds a threshold. It is noted that if multiple reference watermarks were employed (and multiple rotations/correlations with the filtered message array were computed) the filtered reference watermark array having the highest correlation with the filtered array of message values is assumed to correspond if it is sufficiently high to meet or exceed the threshold. A determination (action 460) that the embedded watermark 100 contains a message that corresponds to a message of the selected reference watermark (e.g., reference watermark 100) is then made. Appropriate action may then be taken.

The repeated rotations by 90° and correlations are preferably made because the rotation value represents a modulo value of rotation, as opposed to an actual rotation of the embedded watermark 100. This arises because if in considering two peaks 322 in the Fourier transform 320 (FIG. 11), it is not known beforehand which represents the "horizontal" direction and which the "vertical" direction in the embedded watermark. Accordingly, by rotating the filtered array of message values with respect to the filtered array of reference message values by 90° a match between the embedded watermark 100 and the reference watermark 100 may be determined with higher reliability.

It is noted that the process flow of FIG. 16 may be readily modified to accommodate the situation where the embedded watermark 100 has been rotated and translated. Indeed, the process flow of actions 420, 422, and 424 of FIG. 15 may be inserted at action 452 of FIG. 16 to achieve this functionality.

Reference is now made to FIG. 17, which is a flow diagram illustrating process steps that may be carried out in accordance with one or more alternative aspects of the present invention. In particular, this flow diagram shows an alternative technique for executing the action and/or function of watermark detection 210 (FIG. 6). In particular, after actions 400, 402 and 404 have been carried out (FIG. 14), the process flow preferably advances to action 480, where a two-dimensional Fourier transform of the filtered array of reference message values is preferably obtained. Preferably, this two-dimensional Fourier transform may be predetermined because the reference watermark 100, and the filtered array of reference message values may be predetermined. Any of the known methodologies for carrying out a two-dimensional Fourier transform may be employed, such as utilizing a FFT.

Next, a two-dimensional Fourier transform (e.g., a FFT) of the filtered array of message values is preferably computed (action 482). At action 484, a modified array is preferably computed by taking a product of the two-dimensional Fourier transform of the filtered array of reference message values and the two-dimensional Fourier transform of the filtered array of message values on a point-by-point basis. Next, an inverse Fourier transform of the modified array is preferably computed (action 486). At action 488, a maximum value from among the results of the inverse Fourier transform of the modified array is determined.

At action 490, the two-dimensional Fourier transform of the filtered array of reference message values and the two-dimensional Fourier transform of the filtered array of message values are preferably rotated with respect to one another by a multiple of 90°, such as unity. At action 492, a determination is made as to whether or not a rotation of 360° has been reached. If not, the process flow preferably feeds back to action 484, where a subsequent modified array is preferably computed by taking a product of the two-dimensional Fourier transform of the filtered array of reference message values and the two-dimensional Fourier transform of the filtered array of message values (as rotated) on point-by-point basis.

Actions 484, 486, 488, and 490 are preferably repeated until a rotation of 360° between the two-dimensional Fourier transform of the filtered array of reference message values and the two-dimensional Fourier transform of the filtered array of message values is obtained (action 492). At that point, the process flow preferably advances to action 494 where a determination is made as to whether the embedded watermark 100 corresponds to the reference watermark 100. In particular, a determination that the embedded watermark 100 corresponds to the reference watermark 100 is preferably made when one of the maximum values of the inverse Fourier transform of the modified arrays exceeds a threshold. It is noted that if multiple reference watermarks were employed (and multiple inverse Fourier transforms were computed based thereon), the filtered reference message array resulting in the highest inverse Fourier transform result with the filtered array of message values is assumed to correspond to the embedded watermark 100 (assuming that it is sufficiently high to meet or exceed the threshold). If correspondence is not found, the process preferably advances to action 495 (watermark not detected). If correspondence is found, at action 496, a match between the message of the embedded watermark 100A and the message of the reference watermark 100 can be made and appropriate action taken.

In accordance with one or more further aspects of the present invention, the functionality disclosed in FIGS. 6, 8, 12, and 14–17 (and discussed with reference thereto) may be implemented in hardware, for example, using off the shelf digital and/or analog components, by utilizing one or more application specific integrated circuits (ASICs), and/or utilizing one or more processing devices, such as programmable digital signal processing devices, microprocessors, computers operating under the control of one or more software programs, etc. Alternatively, this functionality may be implemented as a software program that may be executed by an appropriate processing device, such as a computer, to achieve the one or more aspects of the invention. The software program may be stored on an appropriate storage medium, such as a floppy disc, a CD-ROM, a memory chip, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of detecting a watermark in a two-dimensional frame of data, the frame of data including a plurality of data values representing the watermark embedded in a frame of content data, the method comprising:

computing a filtered frame of data from the frame of data having at least some harmonic frequency components corresponding to the watermark that are emphasized as compared to at least some frequency components corresponding to the content data;

computing a two-dimensional Fourier transform of the filtered frame of data to produce a two-dimensional frequency spectrum of the filtered frame of data;

selecting a set of frequency components associated with the watermark from among the frequency components of the two-dimensional frequency spectrum; and computing at least one of a rotation value, a resizing value, and a translation value associated with the watermark as compared to a reference watermark using one or more of the frequency components of the selected set.

2. The method of claim 1, wherein the frame of data are one of pixel data and audio data.

3. The method of claim 1, wherein:

the watermark substantially matches the reference watermark but for the at least one of the rotation value, the resizing value, and the translation value;

the watermark and the reference watermark include a respective plurality of data blocks representing a message; and each data block includes an array of data values arranged in at least one of a first and second pattern defined by the message.

4. The method of claim 3, wherein the first and second patterns may be defined by four quadrants of data values in a Cartesian system of coordinates; and the first and third quadrants have equal data values and the second and fourth quadrants have equal data values.

5. The method of claim 4, wherein the data values of the first and third quadrants and the data values of the second and fourth quadrants of the first and second patterns consist of two opposite polarity numbers.

6. The method of claim 5, wherein the data values of the first and third quadrants of the first pattern and the data values of the first and third quadrants of the second pattern consist of two opposite polarity numbers.

7. The method of claim 3, wherein the filtered frame of data includes a plurality of filtered data values, each filtered data value corresponding with one of the data values of the frame of data and being equal to a sum-of-products of data values of a reference data block and a respective set of data values of the frame of data.

8. The method of claim 7, wherein the data values of the reference data block are arranged in one of the at least first and second patterns such that a given one of the filtered values tends to peak when the respective set of data values of the frame of data includes a given one of the data blocks of the watermark that is in at least partial registration with the reference data block.

9. The method of claim 8, wherein:

the given filtered value tends to peak with a positive polarity when both the given one of the data blocks of the watermark and the reference data block include data values arranged in the first or second pattern; and the given filtered value tends to peak with a negative polarity when the given one of the data blocks of the watermark includes data values arranged in the one of the first and second patterns and the reference data block includes data values arranged in the other one of the first and second patterns.

10. The method of claim 9, wherein the reference data block includes a center within the array of data values; and the respective set of data values of the frame of data are those data values covered by the reference data block when the center of the reference data block is aligned with the corresponding one of the data values of the frame of data.

11. The method of claim 7, wherein the step of computing the filtered frame of data comprises computing, for each filtered value, an absolute value of the sum-of-products of the values of the reference data block and the respective set of values of the frame of data.

12. The method of claim 1, wherein the step of computing the two-dimensional Fourier transform of the filtered frame of data includes computing a two-dimensional Fast Fourier transform (FFT) to produce the two-dimensional frequency spectrum of the filtered frame of data.

13. The method of claim 1, wherein the step of selecting the set of frequency components associated with the watermark includes selecting at least some of the harmonic frequency components corresponding to the watermark from among the frequency components of the two-dimensional frequency spectrum.

14. The method of claim 13, wherein the at least some of the harmonic frequency components include the second harmonic frequency components corresponding to the watermark.

15. The method of claim 13, wherein the step of computing at least one of the rotation value, the resizing value, and the translation value associated with the watermark includes determining (i) one or more deviations of the geometric positions within the two-dimensional Fourier transform of at least one of the selected harmonic frequency components corresponding to the watermark as compared with expected geometric positions of those components defined by the reference watermark; or (ii) one or more deviations in the phases of at least one of the selected harmonic frequency components corresponding to the watermark as compared with expected phases of those components defined by the reference watermark.

16. The method of claim 15, wherein an area containing the frequency components of the two-dimensional frequency spectrum (i) may be graphically represented in Cartesian coordinates according to an x-axis and a y-axis; (ii) includes a width (W) parallel to the x-axis; (iii) includes a height (H) parallel to the y-axis; and (iv) includes an origin substantially at an intersection of the x-axis and the y-axis.

17. The method of claim 16, wherein the step of computing the rotation value corresponding to the watermark includes determining an angle between a first axis and a reference axis, the first axis being defined by a reference point and at least one of the selected harmonic frequency components corresponding to the watermark and the reference axis being defined by the reference watermark.

18. The method of claim 17, wherein the reference axis lies along one of the x-axis and the y-axis.

19. The method of claim 18, wherein the rotation value corresponding to the watermark is substantially proportional to: $\arctan((Fy1*W)/(Fx1*H))$, where Fy1 and Fx1 are the y-axis and x-axis coordinates, respectively, of one of the selected harmonic frequency components corresponding to the watermark.

20. The method of claim 19, wherein the rotation value corresponding to the watermark is substantially equal to $(180/n)*\arctan((Fy1*W)/(Fx1*H))$ degrees.

21. The method of claim 17, wherein the step of computing the rotation value corresponding to the watermark includes:
determining two or more angles between (i) respective axes defined by the reference point and respective ones of the selected harmonic frequency components corresponding to the watermark, and (ii) one or more reference axes defined by the reference watermark; and
determining the rotation value from among the two or more angles.

22. The method of claim 16, wherein the step of computing the resizing value corresponding to the watermark includes comparing (i) a period (P) computed from at least one of the selected harmonic frequency components corresponding to the watermark; and (ii) a reference period (Pr) defined by the reference watermark.

23. The method of claim 22, wherein the step of computing the resizing value corresponding to the watermark includes computing an x-axis resizing value and a y-axis resizing value.

24. The method of claim 23, wherein the step of computing the x-axis resizing value includes:
computing an x-axis period, Px, from one of the selected harmonic frequency components corresponding to the watermark; and
computing a ratio of Px to an x-axis reference period, Prx, of the reference watermark to obtain the x-axis resizing value.

25. The method of claim 24, wherein the x-axis period, Px, is substantially equal to $(H*W)/\sqrt{((Fx1*H)^2+(Fy1*W)^2)}$, where Fx1 and Fy1 are the x-axis and y-axis coordinates, respectively, of the one of the selected harmonic frequency components corresponding to the watermark.

26. The method of claim 25, wherein the reference watermark includes a plurality of data blocks, each data block including a plurality of values arranged in rows and columns, the number of values in each of the rows being equal to the x-axis reference period, Prx, of the reference watermark.

27. The method of claim 26, wherein the one of the selected harmonic frequency components corresponding to the watermark lies substantially along the x-axis or would lie substantially along the x-axis but for the rotation value.

28. The method of claim 23, wherein the step of computing the y-axis resizing value includes:
computing a y-axis period, Py, from one of the selected harmonic frequency components corresponding to the watermark; and
computing a ratio of Py to a y-axis reference period, Pry, of the reference watermark to obtain the y-axis resizing value.

29. The method of claim 28, wherein the y-axis period, Py, is substantially equal to $(H*W)/\sqrt{((Fx2*H)^2+(Fy2*W)^2)}$, where Fx2 and Fy2 are the x-axis and y-axis coordinates, respectively, of the one of the selected harmonic frequency components corresponding to the watermark.

30. The method of claim 29, wherein the reference watermark includes a plurality of data blocks, each data block including a plurality of values arranged in rows and columns, the number of values in each of the columns being equal to the y-axis reference period, Pry, of the reference watermark.

31. The method of claim 30, wherein the one of the selected harmonic frequency components corresponding to the watermark lies substantially along the y-axis or would lie substantially along the y-axis but for the rotation value.

32. The method of claim 16, wherein the step of computing the translation value corresponding to the watermark includes obtaining phases from at least two of the selected harmonic frequency components corresponding to the watermark.

33. The method of claim 32, wherein:
the translation value is based on a first distance in a first direction and a second distance in a second direction;
the first distance is proportional to a phase, $\theta 1$, of one of the selected harmonic frequency components corresponding to the watermark; and
the second distance is proportional to a phase, $\theta 2$, of another of the selected harmonic frequency components corresponding to the watermark.

34. The method of claim 33, wherein:
the first distance is substantially equal to $(\theta 1*H*W)/2n*\sqrt{((Fx1*H)^2+(Fy1*W)^2)}$, where Fx1 and Fy1 are the x-axis and y-axis coordinates, respectively, of the one of the selected harmonic frequency components corresponding to the watermark; and the second distance is substantially equal to $(\theta 2*H*W)/2n*\sqrt{((Fx2*H)^2+(Fy2*W)^2)}$, where Fx2 and Fy2 are the x-axis and y-axis coordinates, respectively, of the other of the selected harmonic frequency components corresponding to the watermark.

35. The method of claim 34, wherein the first direction is substantially proportional to arctangent$((Fy1*W)/(Fx1*H))$; and the second direction is substantially proportional to arctangent$((Fy2*W)/(Fx2*H))$.

36. The method of claim 33, wherein the first and second directions are substantially perpendicular to one another.

37. The method of claim 3, further comprising determining a plurality of locations within the frame of data corresponding to at least some of the data blocks of the watermark in accordance with at least one of the rotation value, the resizing value, and the translation value of the watermark.

38. The method of claim 37, wherein the plurality of locations correspond to respective centers of the data blocks of the watermark.

39. The method of claim 37, further comprising determining a filtered array of message values, each filtered message value corresponding with one of the at least some of the data blocks of the watermark and being equal to a sum-of-products of data values of a reference data block and a respective set of data values of the one of the at least some of the data blocks of the watermark.

40. The method of claim 39, wherein the reference data block includes a center within the array of data values; and the respective set of data values of the one of the at least some of the data blocks of the watermark are those data values covered by the reference data block when the center of the reference data block is aligned with the respective location of the one of the at least some of the data blocks of the watermark.

41. The method of claim 40, further comprising at least one of (i) rotating the reference data block by an amount proportional to the rotation value prior to taking the sum-of-products; and (ii) resizing the reference data block by one or more amounts proportional to the resizing value prior to taking the sum-of-products.

42. The method of claim 39, further comprising determining a filtered array of reference message values, each filtered reference message value corresponding with one of at least some of the data blocks of the reference watermark and being equal to a sum-of-products of data values of the reference data block and the data values of the one of the at least some of the data blocks of the reference watermark.

43. The method of claim 42, wherein the reference data block includes a center within the array of data values; and the data values of the one of the at least some of the data blocks of the reference watermark are those data values covered by the reference data block when the center of the reference data block is aligned with a center of the one of the at least some of the data blocks of the reference watermark.

44. The method of claim 42, wherein the filtered array of reference message values is predetermined.

45. The method of claim 44, further comprising computing a sum-of-products of the filtered array of message values and the filtered array of reference message values.

46. The method of claim 45, further comprising determining that the watermark contains a message that corresponds to a message of the reference watermark when the sum-of-products of the filtered array of message values and the filtered array of reference message values meets or exceeds a threshold.

47. The method of claim 46, further comprising:

determining a set of filtered arrays of reference message values, each array of filtered reference message values being associated with a different reference watermark;

computing a sum-of-products of the filtered array of message values and each of the filtered arrays of reference message values; and determining that the watermark contains a message that corresponds to a message of one of the reference watermarks when the sum-of-products of the filtered array of message values and the filtered array of reference message values associated with the one of the reference watermarks meets or exceeds a threshold.

48. The method of claim 45, further comprising:

translating the filtered array of message values with respect to the filtered array of reference message values by at least one message value location in at least one of a horizontal direction and a vertical direction;

computing a sum-of-products of the filtered array of message values and the filtered array of reference message values;

repeating the translating and computing steps one or more times; and determining that the watermark contains a message that corresponds to a message of the reference watermark when one of the sum-of-products computations meets or exceeds a threshold.

49. The method of claim 45, further comprising:

rotating the filtered array of message values with respect to the filtered array of reference message values in accordance with a multiple of 90°;

computing a sum-of-products of the filtered array of message values and the filtered array of reference message values;

repeating the rotating and computing steps one or more times; and determining that the watermark contains a message that corresponds to a message of the reference watermark when one of the sum-of-products computations meets or exceeds a threshold.

50. The method of claim 42, further comprising obtaining a two-dimensional Fourier transform of the filtered array of reference message values;

computing a two-dimensional Fourier transform of the filtered array of message values;

computing a modified array by taking a product of the two-dimensional Fourier transform of the filtered array of reference message values and the two-dimensional Fourier transform of the filtered array of message values on a point-by-point basis;

computing an inverse Fourier transform of the modified array;

determining a maximum value from the inverse Fourier transform of the modified array;

rotating the two-dimensional Fourier transform of the filtered array of reference message values relative to the two-dimensional Fourier transform of the filtered array of message values by a multiple of 90°;

computing subsequent modified array by taking a product of the two-dimensional Fourier transform of the filtered array of reference message values and the two-dimensional Fourier transform of the filtered array of message values on a point-by-point basis;

computing an inverse Fourier transform of the subsequent modified array;

determining a subsequent maximum value from the inverse Fourier transform of the subsequent modified array;

repeating the rotating, computing, and determining steps one or more times; and determining that the watermark contains a message that corresponds to a message of the reference watermark when one of the maximum values meets or exceeds a threshold.

51. A processing device operating under the control of a program, the program causing the processing device to carry out a method of detecting a watermark in a two-dimensional frame of data, the frame of data including a plurality of data values representing the watermark embedded in a frame of content data, the method comprising:

computing a filtered frame of data from the frame of data having at least some harmonic frequency components corresponding to the watermark that are emphasized as compared to at least some frequency components corresponding to the content data;

computing a two-dimensional Fourier transform of the filtered frame of data to produce a two-dimensional frequency spectrum of the filtered frame of data;

selecting a set of frequency components associated with the watermark from among the frequency components of the two-dimensional frequency spectrum; and computing at least one of a rotation value, a resizing value, and a translation value associated with the watermark as compared to a reference watermark using one or more of the frequency components of the selected set.

52. The processing device of claim 51, wherein:

the watermark substantially matches the reference watermark but for the at least one of the rotation value, the resizing value, and the translation value;

the watermark and the reference watermark each include a respective plurality of data blocks representing a message; and each data block includes an array of data values arranged in at least one of a first and second pattern defined by the message.

53. The processing device of claim 52, wherein:

the first and second patterns may be defined by four quadrants of data values in a Cartesian system of coordinates; and the first and third quadrants have equal data values and the second and fourth quadrants have equal data values;

the data values of the first and third quadrants and the data values of the second and fourth quadrants of the first and second patterns consist of two opposite polarity numbers;

the data values of the first and third quadrants of the first pattern and the data values of the first and third quadrants of the second pattern consist of two opposite polarity numbers.

54. The processing device of claim 52, wherein the filtered frame of data includes a plurality of filtered data values, each filtered data value corresponding with one of the data values of the frame of data and being equal to a sum-of-products of data values of a reference data block and a respective set of data values of the frame of data.

55. The processing device of claim 54, wherein the data values of the reference data block are arranged in one of the at least first and second patterns such that a given one of the filtered values tends to peak when the respective set of data values of the frame of data includes a given one of the data blocks of the watermark that is in at least partial registration with the reference data block.

56. The processing device of claim 55, wherein:

the given filtered value tends to peak with a positive polarity when both the given one of the data blocks of the watermark and the reference data block include data values arranged in the first or second pattern; and the given filtered value tends to peak with a negative polarity when the given one of the data blocks of the watermark includes data values arranged in the one of the first and second patterns and the reference data block includes data values arranged in the other one of the first and second patterns.

57. The processing device of claim 56, wherein the reference data block includes a center within the array of data values; and the respective set of data values of the frame of data are those data values covered by the reference data block when the center of the reference data block is aligned with the corresponding one of the data values of the frame of data.

58. The processing device of claim 54, wherein the step of computing the filtered frame of data comprises computing, for each filtered value, an absolute value of the sum-of-products of the values of the reference data block and the respective set of values of the frame of data.

59. The processing device of claim 51, wherein the step of computing the two-dimensional Fourier transform of the filtered frame of data includes computing a two-dimensional Fast Fourier transform (FFT) to produce the two-dimensional frequency spectrum of the filtered frame of data.

60. The processing device of claim 51, wherein the step of selecting the set of frequency components associated with the watermark includes selecting at least some of the harmonic frequency components corresponding to the watermark from among the frequency components of the two-dimensional frequency spectrum.

61. The processing device of claim 60, wherein the at least some of the harmonic frequency components include the second harmonic frequency components corresponding to the watermark.

62. The processing device of claim 60, wherein the step of computing at least one of the rotation value, the resizing value, and the translation value associated with the watermark includes determining (i) one or more deviations of the geometric positions within the two-dimensional Fourier transform of at least one of the selected harmonic frequency components corresponding to the watermark as compared with expected geometric positions of those components defined by the reference watermark; or (ii) one or more deviations in the phases of at least one of the selected harmonic frequency components corresponding to the watermark as compared with expected phases of those components defined by the reference watermark.

63. The processing device of claim 62, wherein an area containing the frequency components of the two-dimensional frequency spectrum (i) may be graphically represented in Cartesian coordinates according to an x-axis and a y-axis; (ii) includes a width (W) parallel to the x-axis; (iii) includes a height (H) parallel to the y-axis; and (iv) includes an origin substantially at an intersection of the x-axis and the y-axis.

64. The processing device of claim 63, wherein the step of computing the rotation value corresponding to the watermark includes determining an angle between a first axis and a reference axis, the first axis being defined by a reference point and at least one of the selected harmonic frequency components corresponding to the watermark and the reference axis being defined by the reference watermark.

65. The processing device of claim 64, wherein the reference axis lies along one of the x-axis and the y-axis.

66. The processing device of claim 65, wherein the rotation value corresponding to the watermark is substantially proportional to: arctangent($(Fy1*W)/(Fx1*H)$), where Fy1 and Fx1 are the y-axis and x-axis coordinates, respectively, of one of the selected harmonic frequency components corresponding to the watermark.

67. The processing device of claim 66, wherein the rotation value corresponding to the watermark is substantially equal to $(180/n)*$arctangent($(Fy1*W)/(Fx1*H)$) degrees.

68. The processing device of claim 64, wherein the step of computing the rotation value corresponding to the watermark includes:
determining two or more angles between (i) respective axes defined by the reference point and respective ones of the selected harmonic frequency components corresponding to the watermark, and (ii) one or more reference axes defined by the reference watermark; and
determining the rotation value from among the two or more angles.

69. The processing device of claim 63, wherein the step of computing the resizing value corresponding to the watermark includes computing an x-axis resizing value and a y-axis resizing value.

70. The processing device of claim 69, wherein the step of computing the x-axis resizing value includes:
computing an x-axis period, Px, from the origin to one of the selected harmonic frequency components corresponding to the watermark; and
computing a ratio of Px to an x-axis reference period, Prx, of the reference watermark to obtain the x-axis resizing value.

71. The processing device of claim 70, wherein the x-axis period, Px, is substantially equal to $(H*W)/\sqrt{((Fx1*H)^2+(Fy1*W)^2)}$, where Fx1 and Fy1 are the x-axis and y-axis coordinates, respectively, of the one of the selected harmonic frequency components corresponding to the watermark.

72. The processing device of claim 71, wherein the reference watermark includes a plurality of data blocks, each data block including a plurality of values arranged in rows and columns, the number of values in each of the rows being equal to the x-axis reference period, Prx, of the reference watermark.

73. The processing device of claim 72, wherein the one of the selected harmonic frequency components corresponding to the watermark lies substantially along the x-axis or would lie substantially along the x-axis but for the rotation value.

74. The processing device of claim 69, wherein the step of computing the y-axis resizing value includes:
computing a y-axis period, Py, from the origin to one of the selected harmonic frequency components corresponding to the watermark; and
computing a ratio of Py to a y-axis reference period, Pry, of the reference watermark to obtain the y-axis resizing value.

75. The processing device of claim 74, wherein the y-axis period, Py, is substantially equal to $(H*W)/\sqrt{(Fx2*H)^2+(Fy2*W)^2}$, where Fx2 and Fy2 are the x-axis and y-axis coordinates, respectively, of the one of the selected harmonic frequency components corresponding to the watermark.

76. The processing device of claim 75, wherein the reference watermark includes a plurality of data blocks, each data block including a plurality of values arranged in rows and columns, the number of values in each of the columns being equal to the y-axis reference period, Pry, of the reference watermark.

77. The processing device of claim 76, wherein the one of the selected harmonic frequency components corresponding to the watermark lies substantially along the y-axis or would lie substantially along the y-axis but for the rotation value.

78. The processing device of claim 63, wherein:
the translation value is based on a first distance in a first direction and a second distance in a second direction;
the first distance is proportional to a phase, $\theta1$, of one of the selected harmonic frequency components corresponding to the watermark; and
the second distance is proportional to a phase, $\theta2$, of another of the selected harmonic frequency components corresponding to the watermark.

79. The processing device of claim 78, wherein:
the first distance is substantially equal to $(\theta1*H*W)/2n*\sqrt{((Fx1*H)^2+(Fy1*W)^2)}$, where Fx1 and Fy1 are the x-axis and y-axis coordinates, respectively, of the one of the selected harmonic frequency components corresponding to the watermark; and
the second distance is substantially equal to $(\theta2*H*W)/2n*\sqrt{((Fx2*H)^2+(Fy2*W)^2)}$, where Fx2 and Fy2 are the x-axis and y-axis coordinates, respectively, of the other of the selected harmonic frequency components corresponding to the watermark.

80. The processing device of claim 79, wherein the first direction is substantially proportional to arctangent $((Fy1*W)/(Fx1*H))$; and the second direction is substantially proportional to arctangent$((Fy2*W)/(Fx2*H))$.

81. The processing device of claim 70, wherein the first and second directions are substantially perpendicular to one another.

82. The processing device of claim 52, wherein the method further comprises determining a plurality of locations within the frame of data corresponding to at least some of the data blocks of the watermark in accordance with at least one of the rotation value, the resizing value, and the translation value of the watermark.

83. The processing device of claim 82, wherein the plurality of locations correspond to respective centers of the data blocks of the watermark.

84. The processing device of claim 82, wherein the method further comprises determining a filtered array of message values, each filtered message value corresponding with one of the at least some of the data blocks of the watermark and being equal to a sum-of-products of data values of a reference data block and a respective set of data values of the one of the at least some of the data blocks of the watermark.

85. The processing device of claim 84, wherein the reference data block includes a center within the array of data values; and the respective set of data values of the one of the at least some of the data blocks of the watermark are those data values covered by the reference data block when the center of the reference data block is aligned with the respective location of the one of the at least some of the data blocks of the watermark.

86. The processing device of claim 85, wherein the method further comprises at least one of (i) rotating the reference data block by an amount proportional to the rotation value prior to taking the sum-of-products; and (ii)

resizing the reference data block by one or more amounts proportional to the resizing value prior to taking the sum-of-products.

87. The processing device of claim 84, wherein the method further comprises determining a filtered array of reference message values, each filtered reference message value corresponding with one of at least some of the data blocks of the reference watermark and being equal to a sum-of-products of data values of the reference data block and the data values of the one of the at least some of the data blocks of the reference watermark.

88. The processing device of claim 87, wherein the reference data block includes a center within the array of data values; and the data values of the one of the at least some of the data blocks of the reference watermark are those data values covered by the reference data block when the center of the reference data block is aligned with a center of the one of the at least some of the data blocks of the reference watermark.

89. The processing device of claim 87, wherein the filtered array of reference message values is predetermined.

90. The processing device of claim 89, wherein the method further comprises computing a sum-of-products of the filtered array of message values and the filtered array of reference message values.

91. The processing device of claim 90, wherein the method further comprises determining that the watermark contains a message that corresponds to a message of the reference watermark when the sum-of-products of the filtered array of message values and the filtered array of reference message values meets or exceeds a threshold.

92. The processing device of claim 91, wherein the method further comprises:
determining a set of filtered arrays of reference message values, each array of filtered reference message values being associated with a different reference watermark;
computing a sum-of-products of the filtered array of message values and each of the filtered arrays of reference message values; and
determining that the watermark contains a message that corresponds to a message of one of the reference watermarks when the sum-of-products of the filtered array of message values and the filtered array of reference message values associated with the one of the reference watermarks meets or exceeds a threshold.

93. The processing device of claim 90, wherein the method further comprises:
translating the filtered array of message values with respect to the filtered array of reference message values by at least one message location in at least one of a horizontal direction and a vertical direction;
computing a sum-of-products of the filtered array of message values and the filtered array of reference message values;
repeating the translating and computing steps one or more times; and
determining that the watermark contains a message that corresponds to a message of the reference watermark when one of the sum-of-products computations meets or exceeds a threshold.

94. The processing device of claim 90, wherein the method further comprises:
rotating the filtered array of message values with respect to the filtered array of reference message values in accordance with a multiple of 90°;
computing a sum-of-products of the filtered array of message values and the filtered array of reference message values;
repeating the rotating and computing steps one or more times; and
determining that the watermark contains a message that corresponds to a message of the reference watermark when one of the sum-of-products computations meets or exceeds a threshold.

95. The processing device of claim 87, wherein the method further comprises:
obtaining a two-dimensional Fourier transform of the filtered array of reference message values;
computing a two-dimensional Fourier transform of the filtered array of message values;
computing a modified array by taking a product of the two-dimensional Fourier transform of the filtered array of reference message values and the two-dimensional Fourier transform of the filtered array of message values on a point-by-point basis;
computing an inverse Fourier transform of the modified array;
determining a maximum value from the inverse Fourier transform of the modified array;
rotating the two-dimensional Fourier transform of the filtered array of reference message values relative to the two-dimensional Fourier transform of the filtered array of message values by a multiple of 90°;
computing subsequent modified array by taking a product of the two-dimensional Fourier transform of the filtered array of reference message values and the two-dimensional Fourier transform of the filtered array of message values on a point-by-point basis;
computing an inverse Fourier transform of the subsequent modified array;
determining a subsequent maximum value from the inverse Fourier transform of the subsequent modified array;
repeating the rotating, computing, and determining steps one or more times; and
determining that the watermark contains a message that corresponds to a message of the reference watermark when one of the maximum values meets or exceeds a threshold.

96. A storage medium containing a program for causing a processing device to carry out a method of detecting a watermark in a two-dimensional frame of data, the frame of data including a plurality of data values representing the watermark embedded in a frame of content data, the method comprising:
computing a filtered frame of data from the frame of data having at least some harmonic frequency components corresponding to the watermark that are emphasized as compared to at least some frequency components corresponding to the content data;
computing a two-dimensional Fourier transform of the filtered frame of data to produce a two-dimensional frequency spectrum of the filtered frame of data;
selecting a set of frequency components associated with the watermark from among the frequency components of the two-dimensional frequency spectrum; and
computing at least one of a rotation value, a resizing value, and a translation value associated with the watermark as compared to a reference watermark using one or more of the frequency components of the selected set.

97. The storage medium of claim 96, wherein:
the watermark substantially matches the reference watermark but for the at least one of the rotation value, the resizing value, and the translation value;
the watermark and the reference watermark include a respective plurality of data blocks representing a message; and
each data block includes an array of data values arranged in at least one of a first and second pattern defined by the message.

98. The storage medium of claim 97 wherein:
the first and second patterns may be defined by four quadrants of data values in a Cartesian system of coordinates; and the first and third quadrants have equal data values and the second and fourth quadrants have equal data values;
the data values of the first and third quadrants and the data values of the second and fourth quadrants of the first and second patterns consist of two opposite polarity numbers; and
the data values of the first and third quadrants of the first pattern and the data values of the first and third quadrants of the second pattern consist of two opposite polarity numbers.

99. The storage medium of claim 97, wherein the filtered frame of data includes a plurality of filtered data values, each filtered data value corresponding with one of the data values of the frame of data and being equal to a sum-of-products of data values of a reference data block and a respective set of data values of the frame of data.

100. The storage medium of claim 99, wherein the data values of the reference data block are arranged in one of the at least first and second patterns such that a given one of the filtered values tends to peak when the respective set of data values of the frame of data includes a given one of the data blocks of the watermark that is in at least partial registration with the reference data block.

101. The storage medium of claim 100, wherein:
the given filtered value tends to peak with a positive polarity when both the given one of the data blocks of the watermark and the reference data block include data values arranged in the first or second pattern; and
the given filtered value tends to peak with a negative polarity when the given one of the data blocks of the watermark includes data values arranged in the one of the first and second patterns and the reference data block includes data values arranged in the other one of the first and second patterns.

102. The storage medium of claim 101, wherein the reference data block includes a center within the array of data values; and the respective set of data values of the frame of data are those data values covered by the reference data block when the center of the reference data block is aligned with the corresponding one of the data values of the frame of data.

103. The storage medium of claim 99, wherein the step of computing the filtered frame of data comprises computing, for each filtered value, an absolute value of the sum-of-products of the values of the reference data block and the respective set of values of the frame of data.

104. The storage medium of claim 96, wherein the step of computing the two-dimensional Fourier transform of the filtered frame of data includes computing a two-dimensional Fast Fourier transform (FFT) to produce the two-dimensional frequency spectrum of the filtered frame of data.

105. The storage medium of claim 96, wherein the step of selecting the set of frequency components associated with the watermark includes selecting at least some of the harmonic frequency components corresponding to the watermark from among the frequency components of the two-dimensional frequency spectrum.

106. The storage medium of claim 105, wherein the at least some of the harmonic frequency components include the second harmonic frequency components corresponding to the watermark.

107. The storage medium of claim 105, wherein the step of computing at least one of the rotation value, the resizing value, and the translation value associated with the watermark includes determining (i) one or more deviations of the geometric positions within the two-dimensional Fourier transform of at least one of the selected harmonic frequency components corresponding to the watermark as compared with expected geometric positions of those components defined by the reference watermark; or (ii) one or more deviations in the phases of at least one of the selected harmonic frequency components corresponding to the watermark as compared with expected phases of those components defined by the reference watermark.

108. The storage medium of claim 107, wherein an area containing the frequency components of the two-dimensional frequency spectrum (i) may be graphically represented in Cartesian coordinates according to an x-axis and a y-axis; (ii) includes a width (W) parallel to the x-axis; (iii) includes a height (H) parallel to the y-axis; and (iv) includes an origin substantially at an intersection of the x-axis and the y-axis.

109. The storage medium of claim 108, wherein the step of computing the rotation value corresponding to the watermark includes determining an angle between a first axis and a reference axis, the first axis being defined by a reference point and at least one of the selected harmonic frequency components corresponding to the watermark and the reference axis being defined by the reference watermark.

110. The storage medium of claim 109, wherein the reference axis lies along one of the x-axis and the y-axis.

111. The storage medium of claim 110, wherein the rotation value corresponding to the watermark is substantially proportional to: arctangent((Fy1*W)/(Fx1*H)), where Fy1 and Fx1 are the y-axis and x-axis coordinates, respectively, of one of the selected harmonic frequency components corresponding to the watermark.

112. The storage medium of claim 111, wherein the rotation value corresponding to the watermark is substantially equal to (180/n)*arctangent((Fy1*W)/(Fx1*H)) degrees.

113. The storage medium of claim 109, wherein the step of computing the rotation value corresponding to the watermark includes:
determining two or more angles between (i) respective axes defined by the reference point and respective ones of the selected harmonic frequency components corresponding to the watermark, and (ii) one or more reference axes defined by the reference watermark; and
determining the rotation value from among the two or more angles.

114. The storage medium of claim 108, wherein the step of computing the resizing value corresponding to the watermark includes computing an x-axis resizing value and a y-axis resizing value.

115. The storage medium of claim 114, wherein the step of computing the x-axis resizing value includes:
computing an x-axis period, Px, from the origin to one of the selected harmonic frequency components corresponding to the watermark; and computing a ratio of Px to an x-axis reference period, Prx, of the reference watermark to obtain the x-axis resizing value.

116. The storage medium of claim 115, wherein the x-axis period, Px, is substantially equal to $(H^*W)/\sqrt{((Fx1^*H)^2+(Fy1^*W)^2)}$, where Fx1 and Fy1 are the x-axis and y-axis coordinates, respectively, of the one of the selected harmonic frequency components corresponding to the watermark.

117. The storage medium of claim 116, wherein the reference watermark includes a plurality of data blocks, each data block including a plurality of values arranged in rows and columns, a number of values in each of the rows being equal to the x-axis reference period, Prx, of the reference watermark.

118. The storage medium of claim 117, wherein the one of the selected harmonic frequency components corresponding to the watermark lies substantially along the x-axis or would lie substantially along the x-axis but for the rotation value.

119. The storage medium of claim 114, wherein the step of computing the y-axis resizing value includes:

computing a y-axis period, Py, from the origin to one of the selected harmonic frequency components corresponding to the watermark; and computing a ratio of Py to a y-axis reference period, Pry, of the reference watermark to obtain the y-axis resizing value.

120. The storage medium of claim 119, wherein the y-axis period, Py, is substantially equal to $(H^*W)/\sqrt{((Fx2^*H)^2+(Fy2^*W)^2)}$, where Fx2 and Fy2 are the x-axis and y-axis coordinates, respectively, of the one of the selected harmonic frequency components corresponding to the watermark.

121. The storage medium of claim 120, wherein the reference watermark includes a plurality of data blocks, each data block including a plurality of values arranged in rows and columns, a number of values in each of the columns being equal to the y-axis reference period, Pry, of the reference watermark.

122. The storage medium of claim 121, wherein the one of the selected harmonic frequency components corresponding to the watermark lies substantially along the y-axis or would lie substantially along the y-axis but for the rotation value.

123. The storage medium of claim 108, wherein:

the translation value is based on a first distance in a first direction and a second distance in a second direction;

the first distance is proportional to a phase, θ1, of one of the selected harmonic frequency components corresponding to the watermark; and the second distance is proportional to a phase, θ2, of another of the selected harmonic frequency components corresponding to the watermark.

124. The storage medium of claim 123, wherein:

the first distance is substantially equal to $(\theta1^*H^*W)/2n^*\sqrt{((Fx1^*H)^2+(Fy1^*W)^2)}$, where Fx1 and Fy1 are the x-axis and y-axis coordinates, respectively, of the one of the selected harmonic frequency components corresponding to the watermark; and the second distance is substantially equal to $(\theta2^*H^*W)/2n^*\sqrt{((Fx2^*H)^2+(Fy2^*W)^2)}$, where Fx2 and Fy2 are the x-axis and y-axis coordinates, respectively, of the other of the selected harmonic frequency components corresponding to the watermark.

125. The storage medium of claim 124, wherein the first direction is substantially proportional to arctangent $((Fy1^*W)/(Fx1^*H))$; and the second direction is substantially proportional to arctangent$((Fy2^*W)/(Fx2^*H))$.

126. The storage medium of claim 123, wherein the first and second directions are substantially perpendicular to one another.

127. The storage medium of claim 97, wherein the method further comprises determining a plurality of locations within the frame of data corresponding to at least some of the data blocks of the watermark in accordance with at least one of the rotation value, the resizing value, and the translation value of the watermark.

128. The storage medium of claim 127, wherein the plurality of locations correspond to respective centers of the data blocks of the watermark.

129. The storage medium of claim 127, wherein the method further comprises determining a filtered array of message values, each filtered message value corresponding with one of the at least some of the data blocks of the watermark and being equal to a sum-of-products of data values of a reference data block and a respective set of data values of the one of the at least some of the data blocks of the watermark.

130. The storage medium of claim 129, wherein the reference data block includes a center within the array of data values; and the respective set of data values of the one of the at least some of the data blocks of the watermark are those data values covered by the reference data block when the center of the reference data block is aligned with the respective location of the one of the at least some of the data blocks of the watermark.

131. The storage medium of claim 130, wherein the method further comprises at least one of (i) rotating the reference data block by an amount proportional to the rotation value prior to taking the sum-of-products; and (ii) resizing the reference data block by one or more amounts proportional to the resizing value prior to taking the sum-of-products.

132. The storage medium of claim 129, wherein the method further comprises determining a filtered array of reference message values, each filtered reference message value corresponding with one of at least some of the data blocks of the reference watermark and being equal to a sum-of-products of data values of the reference data block and the data values of the one of the at least some of the data blocks of the reference watermark.

133. The storage medium of claim 132, wherein the reference data block includes a center within the array of data values; and the data values of the one of the at least some of the data blocks of the reference watermark are those data values covered by the reference data block when the center of the reference data block is aligned with a center of the one of the at least some of the data blocks of the reference watermark.

134. The storage medium of claim 132, wherein the filtered array of reference message values is predetermined.

135. The storage medium of claim 134, wherein the method further comprises computing a sum-of-products of the filtered array of message values and the filtered array of reference message values.

136. The storage medium of claim 135, wherein the method further comprises determining that the watermark contains a message that corresponds to a message of the reference watermark when the sum-of-products of the filtered array of message values and the filtered array of reference message values meets or exceeds a threshold.

137. The storage medium of claim 136, wherein the method further comprises:

determining a set of filtered arrays of reference message values, each array of filtered reference message values being associated with a different reference watermark;

computing a sum-of-products of the filtered array of message values and each of the filtered arrays of reference message values; and determining that the watermark contains a message that corresponds to a message of one of the reference watermarks when the sum-of-products of the filtered array of message values and the filtered array of reference message values associated with the one of the reference watermarks meets or exceeds a threshold.

138. The storage medium of claim 135, wherein the method further comprises:

translating the filtered array of message values with respect to the filtered array of reference message values by at least one message value location in at least one of a horizontal direction and a vertical direction;

computing a sum-of-products of the filtered array of message values and the filtered array of reference message values;

repeating the translating and computing steps one or more times; and determining that the watermark contains a message that corresponds to a message of the reference watermark when one of the sum-of-products computations meets or exceeds a threshold.

139. The storage medium of claim 135, wherein the method further comprises:

rotating the filtered array of message values with respect to the filtered array of reference message values in accordance with a multiple of 90°;

computing a sum-of-products of the filtered array of message values and the filtered array of reference message values;

repeating the rotating and computing steps one or more times; and determining that the watermark contains a message that corresponds to a message of the reference watermark when one of the sum-of-products computations meets or exceeds a threshold.

140. The storage medium of claim 132, wherein the method further comprises:

obtaining a two-dimensional Fourier transform of the filtered array of reference message values;

computing a two-dimensional Fourier transform of the filtered array of message values;

computing a modified array by taking a product of the two-dimensional Fourier transform of the filtered array of reference message values and the two-dimensional Fourier transform of the filtered array of message values on a point-by-point basis;

computing an inverse Fourier transform of the modified array;

determining a maximum value from the inverse Fourier transform of the modified array;

rotating the two-dimensional Fourier transform of the filtered array of reference message values relative to the two-dimensional Fourier transform of the filtered array of message values by a multiple of 90°;

computing subsequent modified array by taking a product of the two-dimensional Fourier transform of the filtered array of reference message values and the two-dimensional Fourier transform of the filtered array of message values on a point-by-point basis;

computing an inverse Fourier transform of the subsequent modified array;

determining a subsequent maximum value from the inverse Fourier transform of the subsequent modified array;

repeating the rotating, computing, and determining steps one or more times; and determining that the watermark contains a message that corresponds to a message of the reference watermark when one of the maximum values meets or exceeds a threshold.

* * * * *

UNITED STATES PATENT AND TRADEMARK OFFICE
CERTIFICATE OF CORRECTION

PATENT NO. : 6,865,273 B2
DATED : March 8, 2005
INVENTOR(S) : Peter D. Wendt

It is certified that error appears in the above-identified patent and that said Letters Patent is hereby corrected as shown below:

<u>Title page,</u>
Item [75], "Inventor: Peter D. Wendt, Shiibuya-ku (JP)" should read
-- Inventor: Peter D. Wendt, Shibuya-ku (JP) --

<u>Column 9,</u>
Line 5, "presences" should read -- presence --;

<u>Column 10,</u>
Line 22, "is" should read -- are --;

<u>Column 20,</u>
Line 6, "are" should read -- is --;

<u>Column 21,</u>
Line 51, "(180/n)" should read -- "(180/$\pi$)" --;

<u>Column 22,</u>
Line 66, "2n*√" should read -- $2\pi$*√ --;

<u>Column 23,</u>
Line 5, "2n*√" should read -- $2\pi$*√ --;

<u>Column 27,</u>
Line 14, "(180/n)" should read -- "(180/$\pi$)" --;

<u>Column 28,</u>
Lines 22 and 28, "2n*√" should read -- $2\pi$*√ --;

<u>Column 32,</u>
Line 47, "(180/n)" should read -- "(180/$\pi$)" --;

UNITED STATES PATENT AND TRADEMARK OFFICE
CERTIFICATE OF CORRECTION

PATENT NO.    : 6,865,273 B2
DATED         : March 8, 2005
INVENTOR(S)   : Peter D. Wendt It is certified that error appears in the above-identified patent and that said Letters Patent is hereby corrected as shown below:

<u>Column 33,</u>
Lines 56 and 62, "$2n*\sqrt{}$" should read -- $2\pi*\sqrt{}$ --;

Signed and Sealed this

Ninth Day of August, 2005

JON W. DUDAS
*Director of the United States Patent and Trademark Office*